US011311031B2

(12) United States Patent
Jensen et al.

(10) Patent No.: US 11,311,031 B2
(45) Date of Patent: Apr. 26, 2022

(54) APPARATUSES AND METHODS FOR ENCLOSING A FILLING IN A FOOD PRODUCT

(71) Applicant: NESTEC SA, Vevey (CH)

(72) Inventors: Mallory Jensen, Cambridge, MA (US);
Joel Dupuis, St. Louis, MO (US);
Peter Lobar, Lausanne (CH);
Francisco Roig, Aubigny (FR); Gianni Dallaturca, Parma (IT); Massimo Sironi, Parma (IT)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 930 days.

(21) Appl. No.: 14/807,383

(22) Filed: Jul. 23, 2015

(65) Prior Publication Data

US 2016/0029665 A1    Feb. 4, 2016

Related U.S. Application Data

(60) Provisional application No. 62/030,666, filed on Jul. 30, 2014.

(51) Int. Cl.
| | | |
|---|---|---|
| *A23K 50/48* | (2016.01) | |
| *B65B 39/12* | (2006.01) | |
| *B65B 3/12* | (2006.01) | |
| *A23K 40/00* | (2016.01) | |
| *A23K 40/30* | (2016.01) | |

(Continued)

(52) U.S. Cl.
CPC .............. *A23K 50/48* (2016.05); *A23K 10/20* (2016.05); *A23K 40/00* (2016.05); *A23K 40/30* (2016.05); *A23P 20/25* (2016.08); *B65B 3/12* (2013.01); *B65B 39/12* (2013.01)

(58) Field of Classification Search
CPC .................................. A23P 20/25; B65B 3/12
See application file for complete search history.

(56) References Cited

U.S. PATENT DOCUMENTS

| 2,755,190 A | * | 7/1956 | Oyler | A23B 7/085 |
| | | | | 426/102 |
| 3,681,094 A | * | 8/1972 | Rogers | B65B 25/067 |
| | | | | 426/113 |

(Continued)

FOREIGN PATENT DOCUMENTS

| DE | 20 2005 020038 | 2/2006 |
| DE | 10 2011 119455 | 5/2013 |
| JP | S57-98298 U | 6/1982 |

OTHER PUBLICATIONS

International Search Report and Written Opinion to PCT/IB15/055603 dated Nov. 2, 2015.

*Primary Examiner* — Stephanie A Cox

(57) ABSTRACT

A filling device comprises a modified vacuum-filling head that introduces a viscous filling, such as a gravy, into a loaf matrix in a retortable can so that the filling remains enclosed by the set loaf matrix after retorting. The filling can remain as a viscous gravy or can set as a gel, depending on the formulation of the filling. Preferably the viscous filling is distributed horizontally into the loaf matrix, for example through horizontally-facing apertures, during a pause in the descent of the can away from the filling device. The flow of the filling can be controlled by synchronized pneumatic valves.

6 Claims, 33 Drawing Sheets

(51) Int. Cl.
*A23P 20/25* (2016.01)
*A23K 10/20* (2016.01)

(56) References Cited

U.S. PATENT DOCUMENTS

| | | | | |
|---|---|---|---|---|
| 4,781,939 A | * | 11/1988 | Martin | A23K 10/20 |
| | | | | 426/513 |
| 5,792,504 A | * | 8/1998 | Poppel | A23J 3/227 |
| | | | | 426/646 |
| 6,582,740 B1 | * | 6/2003 | May | A23K 10/20 |
| | | | | 426/106 |
| 6,911,224 B1 | * | 6/2005 | May | A23K 10/20 |
| | | | | 426/106 |
| 2001/0041202 A1 | * | 11/2001 | Dupont | A23K 50/48 |
| | | | | 426/407 |
| 2003/0039728 A1 | | 2/2003 | Herrick et al. | |
| 2010/0170592 A1 | | 7/2010 | Le Roi | |
| 2013/0196035 A1 | | 8/2013 | Passet et al. | |
| 2013/0309367 A1 | * | 11/2013 | Pibarot | A23L 1/3172 |
| | | | | 426/92 |
| 2013/0309372 A1 | | 11/2013 | Watelain et al. | |

* cited by examiner

FIG. 11

| Test | Nozzle | Description | Processing |
|---|---|---|---|
| 1 | vertical | 10g, original parameters, nozzle cut | Frozen |
| 2 | vertical | 10g, new filling parameters, nozzle cut | Frozen, retort |
| 3 | horizontal | 10g, parameters unchanged | Frozen, retort |
| 4 | horizontal | 10g, retort | Frozen, retort |
| 5 | horizontal | 8g, parameters changed as required, retort | Frozen, retort |
| 6 | vertical | 8g, parameters unchanged, retort | Frozen, retort |
| 7 | vertical | 8g, can movement changed | Frozen |
| 8 | horizontal | 8g, can movement changed | Frozen |

FIG. 34

| Sample | 1<br>Gravy, 10g | 2<br>Gravy, 10g | 3<br>Gravy 10g, Loaf 75g | 4<br>Gravy 10g, Loaf 75g | 5<br>Gravy 8g, Loaf 77g |
|---|---|---|---|---|---|
| | | | Standard Deviation Testing | | |
| 1 | 9.1 | 10.3 | 87.2 | 82.7 | 84.2 |
| 2 | 9.5 | 10.4 | 88.7 | 82.7 | 82.2 |
| 3 | 9.2 | 10.8 | 88.2 | 82.8 | 84.9 |
| 4 | 9.2 | 10.3 | 88.4 | 83.7 | 83.6 |
| 5 | 9.9 | 10.4 | 88.3 | 82.6 | 84.0 |
| 6 | 10.1 | 10.5 | 89.7 | 83.9 | 84.4 |
| 7 | 9.9 | 10.5 | 89.3 | 83.3 | 84.4 |
| 8 | 10.3 | 10.4 | 88.2 | 84.0 | 83.4 |
| 9 | 10.4 | 10.5 | 89.5 | 82.3 | 84.5 |
| 10 | 10.4 | 10.5 | 90.7 | 83.8 | 84.8 |
| 11 | - | - | - | 82.3 | 84.5 |
| 12 | - | - | - | 83.0 | - |
| Average | 9.8 | 10.5 | 88.8 | 83.1 | 84.1 |
| STD | 0.51 | 0.14 | 0.99 | 0.62 | 0.77 |

APPARATUSES AND METHODS FOR ENCLOSING A FILLING IN A FOOD PRODUCT

CROSS REFERENCE TO RELATED APPLICATIONS

This application claims priority to U.S. Provisional Application No. 62/030,666 filed Jul. 30, 2014, the disclosure of which is incorporated herein by this reference.

BACKGROUND

The present disclosure relates generally to apparatuses and methods for enclosing a filling in a food product. More specifically, the present disclosure is directed to introducing a viscous filling, such as a gravy, into a loaf matrix so that the filling remains enclosed by the loaf matrix after retorting.

Conventional loaf-type food products are typically coagulated emulsions sold in containers bearing the shape of the loaf-type food products. Loaf-type food products are commonly used as pet foods because they are easily manufactured, readily digested by the animals, very palatable to the animals, and readily formulated to contain necessary nutrients and trace elements.

Pet owners are continually seeking appealing canned food forms or varieties for their pets. Although a loaf product containing a filing may be such a pet food, dispensing the filling into the loaf product is difficult to accomplish without forming holes in the sides of the product, which allow the filling to migrate from the desired center position and spill out of the product, and without compromising production speeds, which decrease output of the product.

SUMMARY

The present disclosure is directed to a filling device comprising a modified vacuum-filling head that introduces a viscous filling, such as a gravy, into a loaf matrix so that the filling remains enclosed by the set loaf matrix after retorting. The filling may remain as a viscous gravy or may set as a gel, depending on the formulation of the filling. Preferably the viscous filling is distributed horizontally into the loaf matrix during a brief pause in the descent of the can away from the filling device.

An advantage of the present disclosure is to introduce a viscous filling into the center of a meat-containing loaf matrix so that the filling remains enclosed by the set loaf matrix after retorting.

Another advantage of the present disclosure is to provide an apparatus and a method that form a canned pet food product containing a first composition, such as a meat emulsion, that substantially or completely encloses a second composition, such as a gravy.

A further advantage of the present disclosure is to provide an apparatus and a method that form a canned pet food product containing two separate phases having a different appearance and/or texture relative to each other.

Still another advantage of the present disclosure is to inject a second composition (e.g. a gravy) into a first composition (e.g. a meat emulsion) such that the second composition does not reach the sides of the first composition, while maintaining the production speed of the resultant canned food product, such as 1000 cans per minute or more.

Yet another advantage of the present disclosure is to provide canned food products that bring variety and appeal to consumers and their pets.

Another advantage of the present disclosure is to provide an apparatus and a method that form a canned pet food product containing a first composition, such as a meat emulsion, that substantially or completely encloses a second composition, such as a gravy, by modifying a standard vacuum filler.

A further advantage of the present disclosure is to form a canned pet food product containing a first composition, such as a meat emulsion, substantially or completely enclosing a second composition, such as a gravy, but having very small or no visible holes on any side of the pet food product.

Additional features and advantages are described herein and will be apparent from the following Detailed Description and the Figures.

BRIEF DESCRIPTION OF THE DRAWINGS

FIG. 11 is a table describing the samples experimentally compared in the Example.

FIG. 34 is a table showing the standard deviations of amounts of the gravy, the loaf, and the total product for each of the tests in the Example.

DETAILED DESCRIPTION

As used in this disclosure and the appended claims, the singular forms "a," "an" and "the" include plural referents unless the context clearly dictates otherwise. The words "comprise," "comprises" and "comprising" are to be interpreted inclusively rather than exclusively. Likewise, the terms "include," "including" and "or" should all be construed to be inclusive, unless such a construction is clearly prohibited from the context. However, the devices and methods disclosed herein may lack any element that is not specifically disclosed. Thus, a disclosure of an embodiment using the term "comprising" includes a disclosure of embodiments "consisting essentially of" and "consisting of" the components and steps identified.

The term "enclosed" means that the enclosed composition is completely or substantially enclosed in a food product. The enclosed composition is "substantially enclosed" if less than 20% of the enclosed composition is visible on the surface of the food product, preferably less than 10%, more preferably less than 5%, most preferably less than 1%.

The term "can" means a rigid retortable container, for example a metal container such as a metal or metal alloy can, a plastic container, a glass container, and combinations thereof. The term "canned" means that a food product is contained in a can.

The term "pet" means any animal which could benefit from or enjoy the food products provided by the present disclosure. The pet may be an avian, bovine, canine, equine, feline, hicrine, lupine, murine, ovine, or porcine animal. The pet may be any suitable animal, and the present disclosure is not limited to a specific pet animal. The term "companion animal" means a dog or a cat. The term "pet food" means any composition intended to be consumed by a pet.

Ranges are used herein in shorthand to avoid listing every value within the range. Any appropriate value within the range may be selected as the upper value or lower value of the range. Moreover, the numerical ranges herein include all integers, whole or fractions, within the range.

All percentages expressed herein are by weight of the total weight of the food composition unless expressed otherwise. When reference is made to the pH, values correspond to measured at 25° C. with standard equipment. As used herein, "about" or "substantially" in reference to a number is understood to refer to numbers in a range of numerals, for example the range of −10% to +10%, preferably −5% to +5%, more preferably −1% to +1%, and even more preferably −0.1% to +0.1% of the referenced number.

Figure 1A:
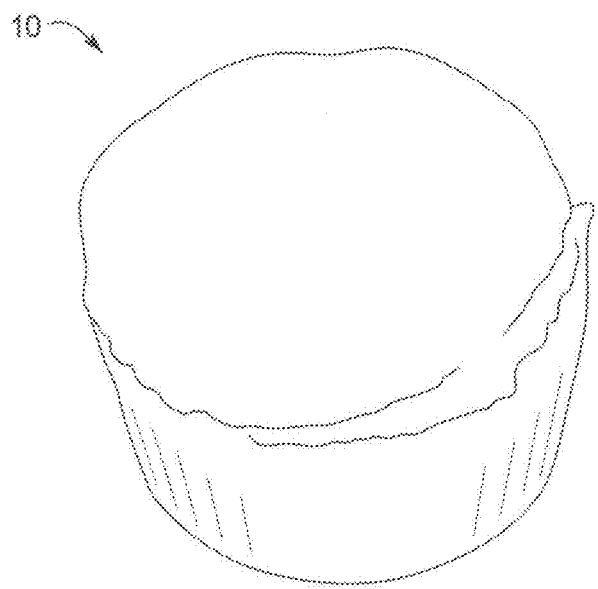
FIG. 1A shows a perspective view of a pet food product containing a first composition completely encasing a second composition in an embodiment provided by the present disclosure.
Figure 1B:
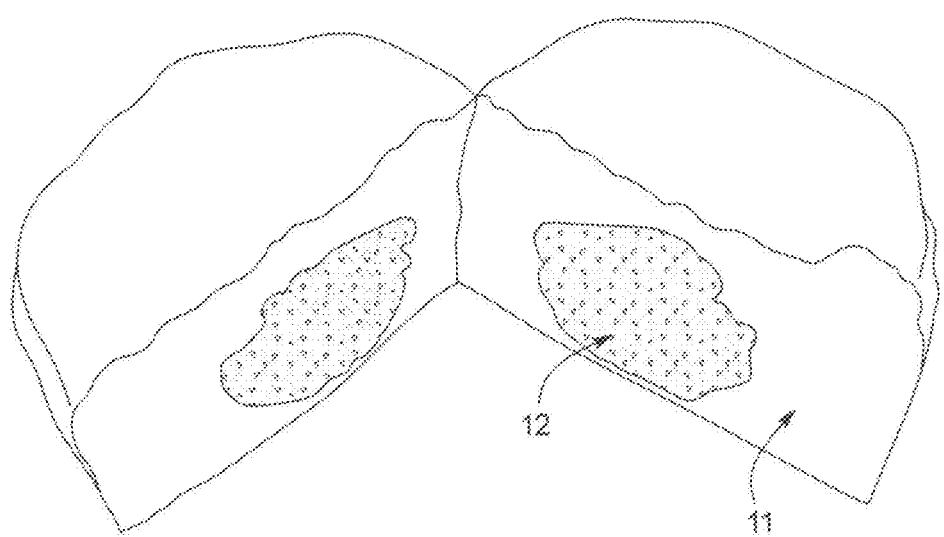
FIG. 1B shows a perspective view of the pet food product of FIG. 1A after the product has been cut open.

FIGS. 1A and 1B generally show an embodiment of a food product 10 comprising a first composition 11, and the first composition 11 forms an outer matrix enclosing a second composition 12. These figures show the first composition 11 completely enclosing the second composition 12, but some embodiments of the food product 10 have the first composition 11 substantially enclosing the second composition 12.

The food product 10 may have a shape corresponding to the shape of the interior of the can in Which the food product 10 is formed. For example, the food product 10 may be substantially cylindrical. However, the food product 10 is not limited to a specific shape and may have any shape.

Preferably the second composition 12 is substantially centered in the food product 10 and has a spherical or ovoid shape. For example, the center of the second composition 12 is preferably about the same as the center of the food product 10. Nevertheless, the food product 10 is not limited to the specific embodiment shown in FIGS. 1A and 1B.

The food product 10 may be a pet food, preferably for a companion animal. The food product 10 may be formed in a can as discussed in more detail later in this application. The first composition 11 and the second composition 12 may comprise any suitable amount of the food product 10. For example, the first composition 11 may comprise from about 25% to about 75% of the food product 10 while the second composition 12 may comprise the remaining 75% to 25% of the food product 10.

In an embodiment, the food product 10 may be one of the food products disclosed by U.S. patent application Ser. No. 13/896,470 to Watelain et al., filed on May 17, 2013 and published as U.S. Patent App. Publication No. 2011/0309372 on Nov. 21, 2013, herein incorporated by reference in its entirety. However, the food product 10 is not limited to the food products disclosed therein.

Preferably the first composition 11 and the second composition 12 are not miscible or have low miscibility and thus form two different phases in the food product 10 that do not mix. This embodiment of the food product 10 comprises two separate phases, namely an outer phase corresponding to the first composition 11 and an inner phase corresponding to the second composition 12.

In an embodiment, the first composition 11 is an emulsion, preferably a meat emulsion. The meat emulsion may comprise any suitable ingredients, for example fibrillar protein and polysaccharides. Suitable fibrillar proteins include myosin, actin, actomyosin, collagen, and mixtures thereof, such as protein from bovine, equine, ovine, avian, porcine, caprine, ovine, and piscine sources. Examples of suitable polysaccharides include starches, gums or mixtures thereof.

In an embodiment, the second composition 12 is a dispersion, such as a colloid dispersion, for example a hydrocolloid dispersion. Preferably the second composition 12 is a flowable sol, an emulsion, or a gel. As discussed in further detail below, the food product 10 may be retorted; depending on the formulation of the second composition 12, the second composition 12 may retain the original form in which it is injected into the first composition 11 or, alternatively, retorting may change the form of the second composition 12. For example, the second composition 12 may be injected into the first composition 11 as a flowable sol or an emulsion, and retorting of the food product 10 may change the form of the second composition 12 to a gel.

In a preferred embodiment, the second composition 12 is a gravy comprising a thickener that is at least one of a starch or a gum. Examples of suitable gums are gellan gum, xanthan gum, locust bean gum, pectin, carrageenan (e.g., kappa, iota and/or lambda), cellulose gum (e.g. carboxy methyl cellulose), gum arabic, konjac, guar gum, agar agar, cassia gum, alginate, and the like, and combinations thereof. Suitable starches include native starches, starch esters, starch ethers, and modified starches, such as starch modified with erythorbic acid, and combinations thereof. Starch sources may include wheat, barley, rice, tapioca, potato and corn, for example. The gravy may also comprise dextrose and/or glycine and may also include a colorant as desired. Ingredients that add flavor and/or aroma to the gravy may also be included as desired.

The first composition 11 and/or the second composition 12 may optionally include additional ingredients. For example, the first composition 11 and/or the second composition 12 may comprise visible pieces of real or simulated ingredients for aesthetic appeal or nutritional function. In some embodiments, at least one of the first composition 11 or the second composition 12 comprise solubilized or dispersed nutritional ingredients, flavor or aroma compounds, or encapsulated flavors or nutrients for release during retorting, in the mouth, or in the alimentary tract.

Figure 2:
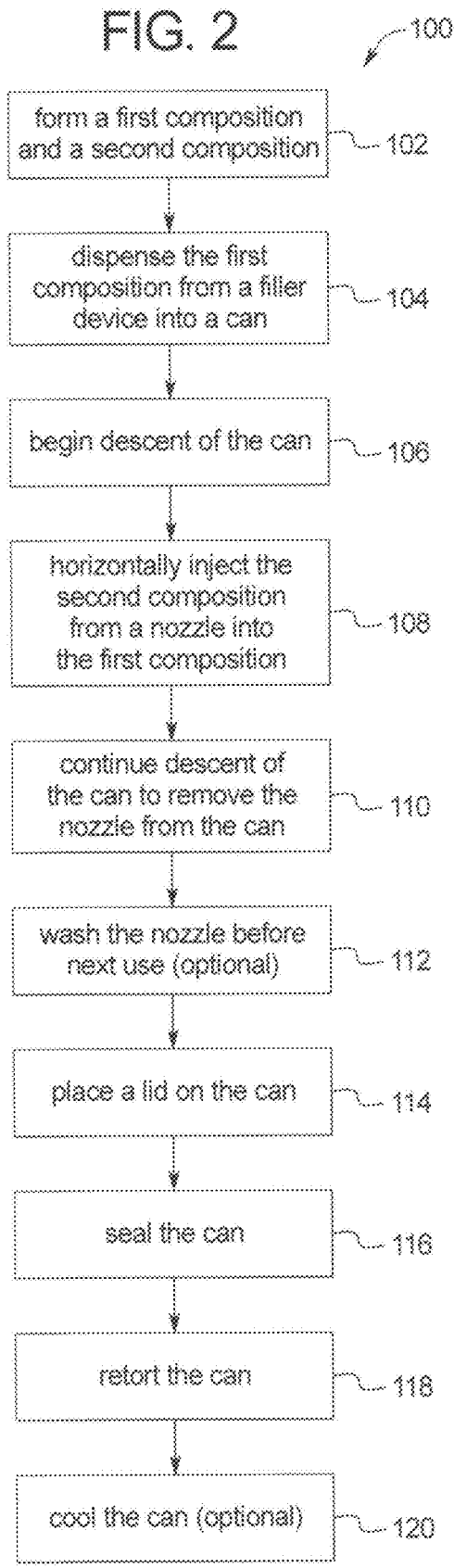
FIG. 2 shows a flowchart of an embodiment of a method provided by the present disclosure.

FIG. 2 shows an embodiment of a method 100 by which a canned food product may be made. The method 100 may comprise forming a first composition and a second composition, preferably separately from each other, in Step 102. In an embodiment, the first composition is an emulsion, preferably a meat emulsion. In an embodiment, the second composition is a dispersion, for example a gel, a flowable sol or an emulsion, preferably a gravy comprising a thickener that is at least one of a starch or a gum.

The method 100 may further comprise dispensing the first composition from a filler device into a can in Step 104. Then the can may begin descent away from the filler device in Step 106, preferably after the dispensing of the first composition into the can is completed.

Then a nozzle extending from the filler device may horizontally inject the second composition into the first composition in Step 108. This horizontal injection preferably comprises injection of the second composition in a direction that is, at least initially, substantially perpendicular relative to the pathway within the nozzle and/or the vertical axis of the can.

Preferably the descent of the can away from the filler device may be briefly paused, and the nozzle may horizontally inject the second composition into the first composition during a time period consisting of this pause. This pause may be 1.5 seconds or less, for example 0.25 to 1.5 seconds.

In Step 110, the descent of the can away from the filler device continues, and the nozzle is removed from the can. Preferably the first composition encloses the second composition in this step. Optionally, the nozzle may be washed after removal from the can, for example by a water flush, in Step 112.

The method 100 may further include placing a lid on the can after the first and second compositions have been dispensed into the can, in Step 114; sealing the can, for example hermetically, in Step 116; and retorting the can, in Step 118. The can may be retorted at any suitable temperature for a suitable amount of time. For example, the can may be retorted a temperature from about 121 to about 128° C. for a time from 25 to 50 minutes. The filled can may optionally be inverted before retorting.

Then the can may be cooled by a device and/or allowed to equilibrate to room temperature in Step 120. For example, the can may be cooled to a temperature of 20 to 35° C. In an embodiment, the can is cooled to a temperature of 22 to 26° C. The resulting food product may comprise a firmly set first composition, such as a meat emulsion, forming an outer matrix enclosing the second composition, such as a gravy. For example, the resulting food product may be the food product 10 disclosed above.

FIGS. 3-7 show an embodiment of a filler device 200 that may form the food product 10 comprising the first composition 11 enclosing the second composition 12. For example, the filler device 200 may be used in the method 100, such as Steps 104 and 106 of the method 100. However, the present disclosure is not limited to the embodiment of the filler device 200 disclosed herein and shown in the figures; in some embodiments the food product 10 may be made by a different filler device, and the method 100 may be performed by a different filler device.

The filler device 200 may comprise a first supply 210 that provides the first composition 11 and a second supply 220 the provides the second composition 12. The filler device 200 may comprise a filling head 230.

A first channel 232 may extend through the filling head 230 so that the filling head 230 may dispense the first composition 11 from the first supply 210 into a can 300 that is positioned under the filling head 230. A second channel 234 may extend through the filling head 230 so that a nozzle 240 extending from the filling head 230 may dispense the second composition 12 from the second supply 220 into the can 300. A port 236 may extend through the filling head 230 so that a vacuum may be formed in the can 300. The first channel 232, the second channel 234 and the port 236 are not shown in all figures so that the other components are easily viewed, and the absence of one of these components from a figure does not imply that the component is no longer present in the filler device 200 at that stage.

The second supply 220 may be connected to the second channel 234 by a hose 222 which preferably is rigid. A first valve 224 may be positioned between the second supply 220 and the hose 222, and a second valve 226 may be positioned between the hose 222 and the second channel 234. The first valve 224 and/or the second valve 226 may be a pneumatic valve. A piston 239 may be connected to the hose 222 for directing the second composition 12 through the hose 222.

A lifting plate 250 may position the can 300; for example, the can 300 may be placed on the lifting plate 250 so that movement of the lifting plate 250 moves the can 300 correspondingly. Preferably the lifting plate 250 is configured to move the can 300 vertically toward and vertically away from the filling device 200. For example, the lifting plate 250 may be or may be formed on a rotating cam. The lifting plate 250 may be one of a plurality of lifting plates, such as ninety lifting plates as a non-limiting example. The plurality of lifting plates may be rotated such that each lifting plate is aligned with the filler device 200 in turn.

Figure 3:
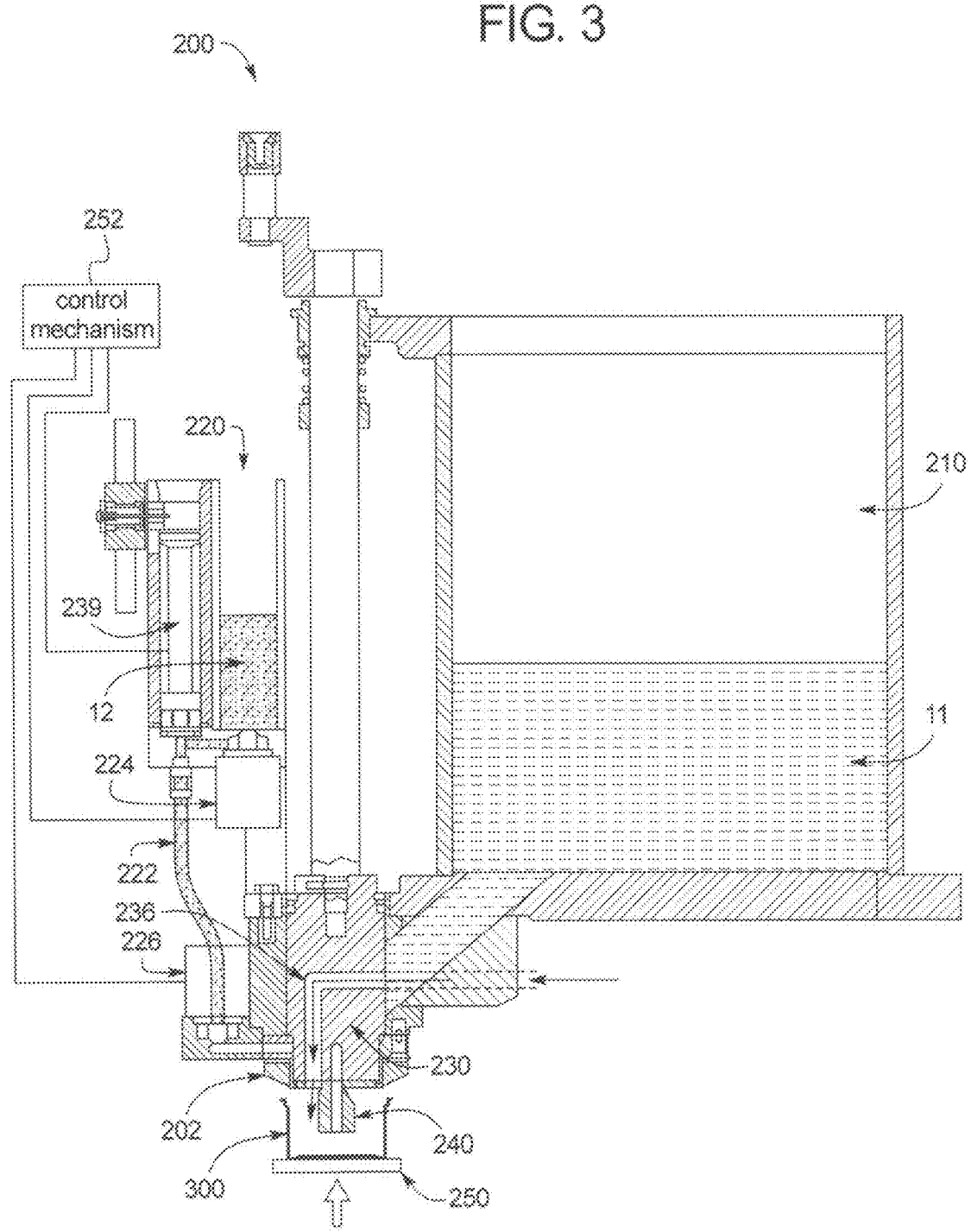
FIGS. 3-7 are schematic views of an embodiment of a filler device provided by the present disclosure and show operation thereof.

The operation of the filler device 200 is generally illustrated in FIGS. 3-7. As shown in FIG. 3, the lifting plate 250 may move the can 300 upward toward the filler device 200, and steam directed through the port 236 may purge the port 236. At this stage, preferably the first valve 224 is open and the second valve 226 is closed so that gravity directs the second composition 12 into the hose 222 to accumulate therein.

Figure 4:
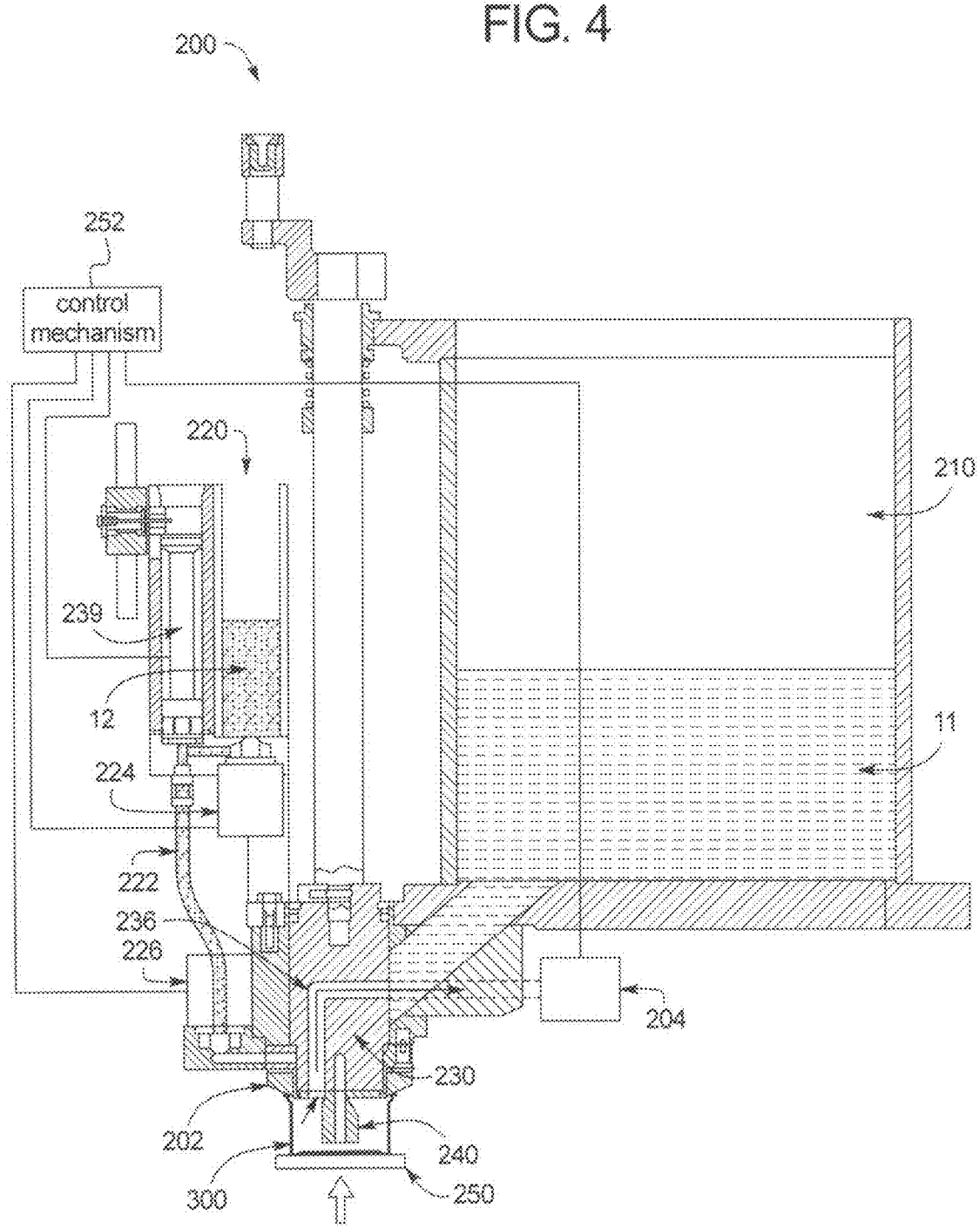

As shown in FIG. 4, the lifting plate 250 may move the can 300 upward against the filling head 230 so that the can 300 is closed by the filler device 200. For example, the filler device 200 may comprise a gasket 202 that may form a seal on the can 300. The closure of the can 300 allows formation of a vacuum in the can 300. For example, the port 236 may be used to draw the air from the can 300 into the filler device 200 to form a vacuum in the can 300. In an embodiment, the filler device 200 comprises a pump 204 that uses the port 236 to form the vacuum in the can 300.

Figure 5:
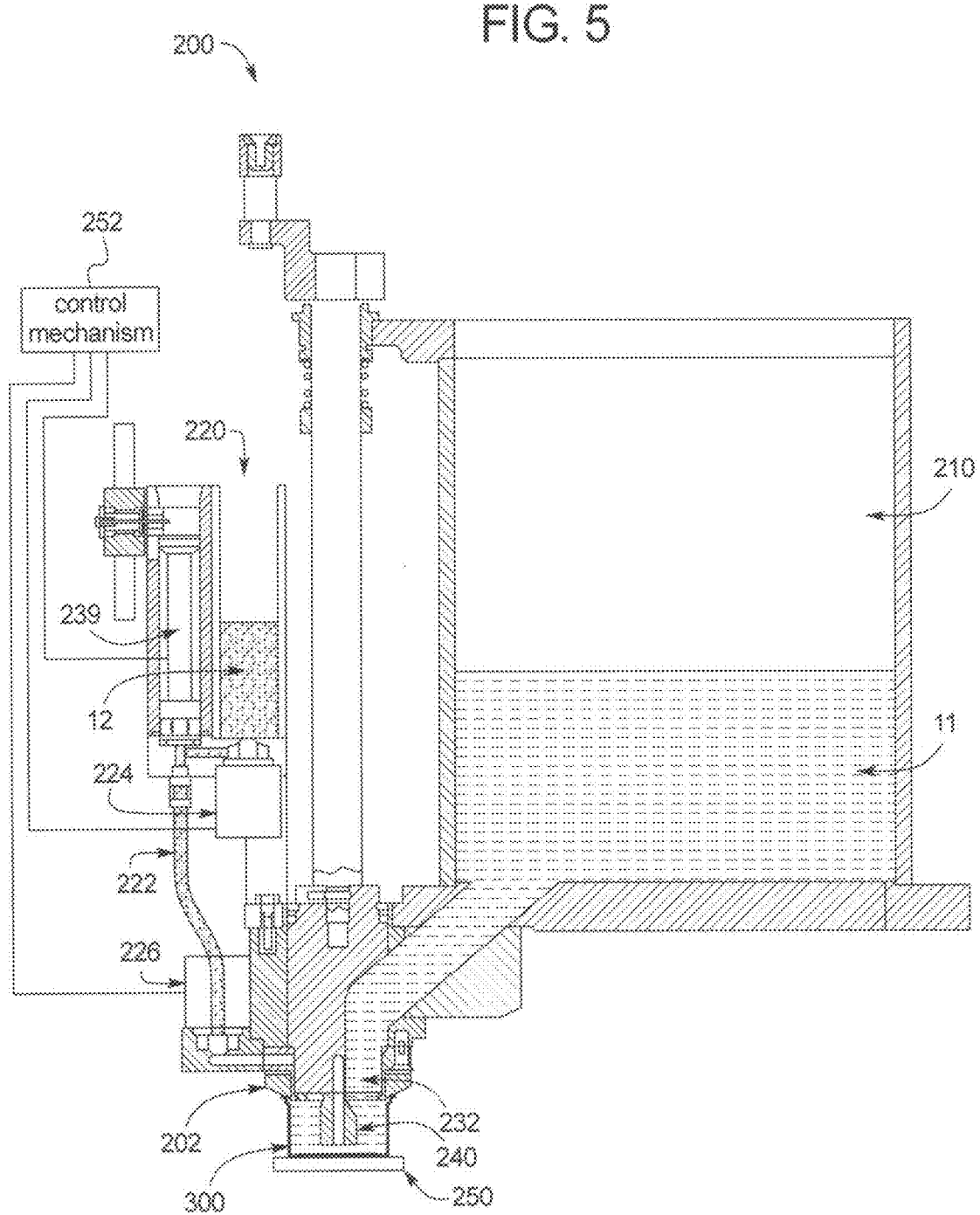

As shown in FIG. 5, the port 236 may cease pulling air from the can 300, and the vacuum that has been formed in the can 300 may pull a predetermined amount of the first composition 11 from the first supply 210 into the can 300. For example, the amount of air pulled through the port 236 after the can 300 has been sealed against the filler device 200 may be calibrated so that the predetermined amount of the first composition 11 is directed from the first supply 210 into the can 300.

Figure 6:
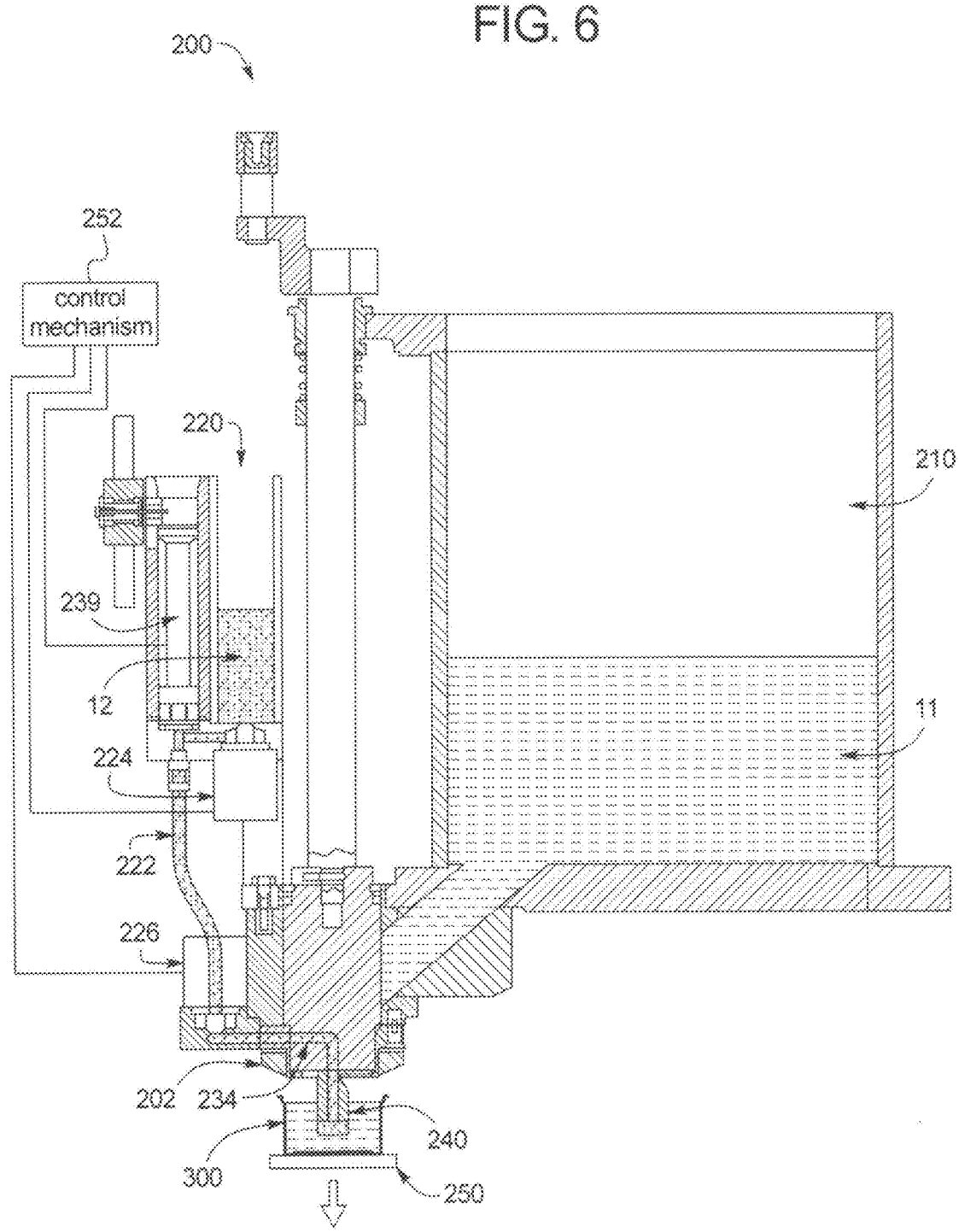

As shown in FIG. 6, the can 300 may be moved away from the filler device 200 while maintaining alignment with the filling head 230, preferably after the predetermined amount of the first composition 11 has been dispensed into the can 300. This descent moves the can 300 out of sealing engagement with the filler device 300. The nozzle 240 remains at least partially positioned within the can 300.

Figure 8:
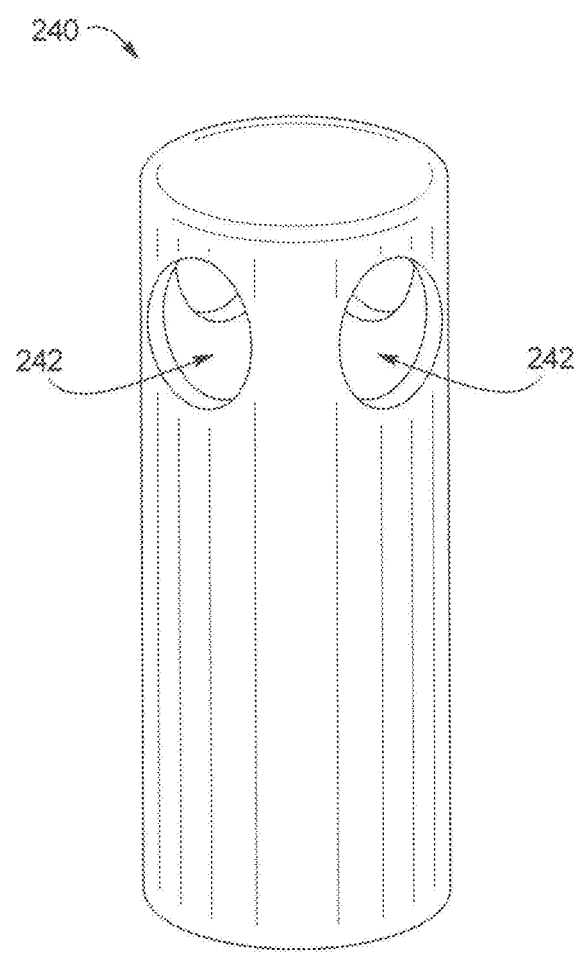
FIG. 8 shows a perspective view of an embodiment of a nozzle provided by the present disclosure.

A non-limiting example of the nozzle 240 is shown in FIG. 8. The nozzle 240 may comprise horizontally-facing apertures 242 that may be positioned in lateral surfaces of the nozzle 240. The horizontally-facing apertures 242 may be at the same height on the nozzle 240 and may be evenly spaced from each other on the nozzle 240. For example, the nozzle 240 may comprise four of the horizontally-facing apertures 242, spaced ninety degrees apart in the nozzle 240. Preferably the horizontally-facing apertures 242 are positioned at the approximate center of the first composition 11, both horizontally and vertically, during injection of the second composition 12. The horizontally-facing apertures 242 may be any suitable diameter, for example a diameter of about 5 mm.

Referring again to FIG. 6, the descent of the can 300 may stop briefly when the horizontally-facing apertures 242 in the nozzle 240 are positioned at the approximate center of the first composition 11 in the can 300, both vertically and horizontally. With the descent of the can 300 briefly stopped and the horizontally-facing apertures 242 in the nozzle 240 positioned at the approximate center of the first composition 11 in the can 300, the second composition 12 may be horizontally injected into the first composition 11. For example, the first valve 224 may be closed and the second valve 246 may be opened at this stage, and the piston 239 may operate to direct a predetermined amount of the second composition 12 from the hose 222 through the nozzle 240.

Figure 7:
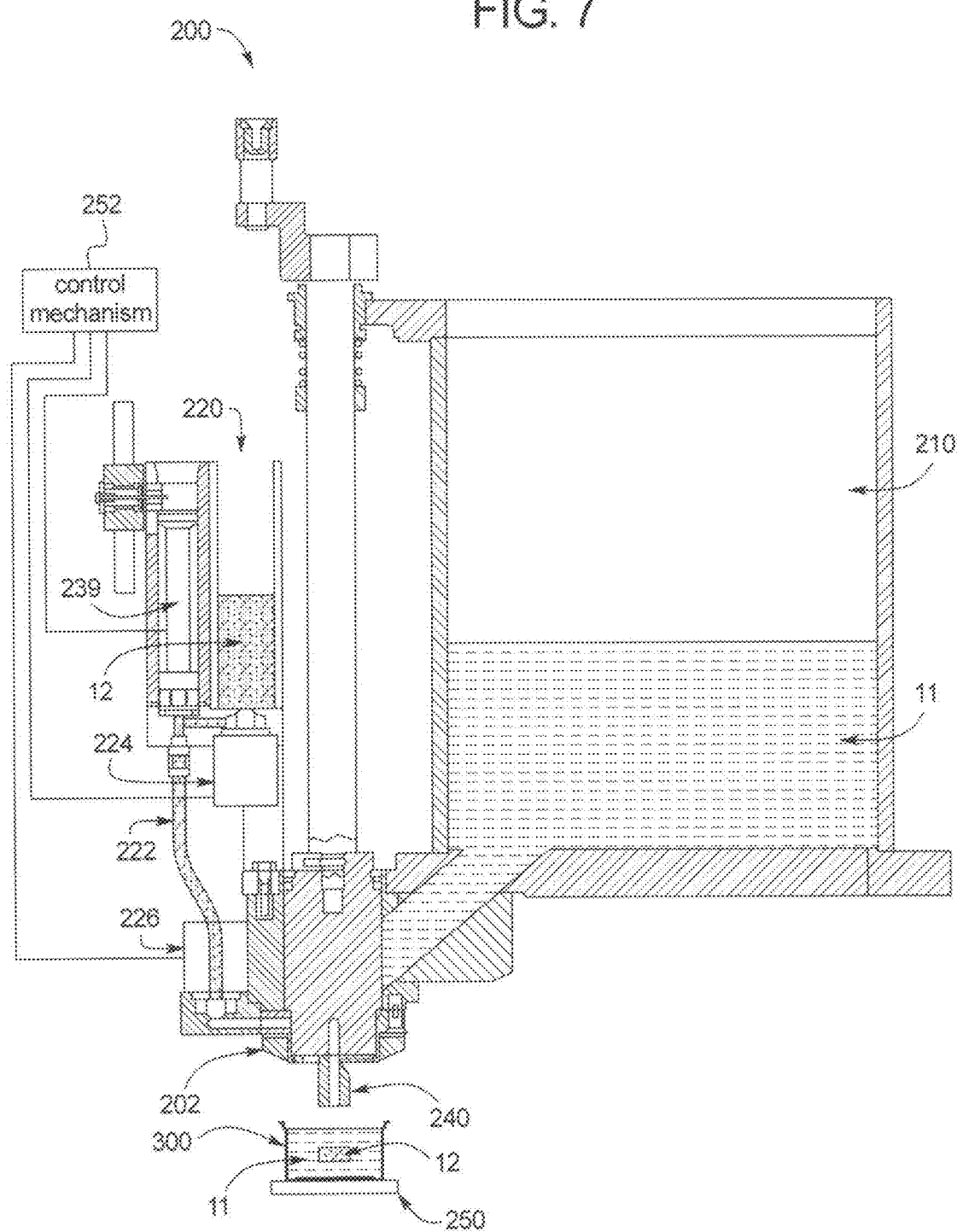

As shown in FIG. 7, the second valve 226 may be closed, the first valve 224 may be opened, and the can 300 may continue the descent away from the filler device 200, preferably after the predetermined amount of the second composition 12 has been dispensed into the can 300. The first composition 11 encloses the second composition 12. Then one or more appropriate devices may place a lid on the can; seal the can, for example hermetically; and retort the can.

Preferably the filler device 200 is connected to a control mechanism 252, for example a computer or another device comprising a processor. The control mechanism 252 may control the progression of the filler device 200 through the stages shown in FIGS. 3-7. For example, the control mechanism 252 may control and coordinate operation of one or more of the lifting plate 250, the pump 204, the piston 239, and the first and second valves 224, 226. Preferably the control mechanism 252 controls the relative timing of these components of the filler device 200; for example, the control mechanism 252 may synchronize the first and second valves 224, 226 so that one valve is open when the other valve is closed.

Example

The following non-limiting example is included merely for illustration.

A study was conducted to assess the ability to achieve a gravy center completely enclosed by loaf in an 85-gram can. A vacuum filler was designed and built as an accurate representation of the filling conditions on an industrial machine.

Two different nozzle designs were tested. Furthermore, several parameters were tested, including a modification to the can movement cam. Changing the can movement cam (the cam that moves the can to and from the vacuum filler) should have no effect on standard loaf fills.

As discussed in further detail below, the target product was achieved in Test 8 with a horizontal nozzle, an 8-gram fill, and a modified can movement cam. Tests 3 and 4 produced the next best product compared to the target. These solutions do not require a change to the can movement cam and were produced with a horizontal nozzle and a 10-gram fill.

The system was specifically designed to simulate filling on an industrial vacuum filler. Servo motors controlled the main valve head, the can movement, and the new gravy piston filler. A control system equipped with an HMI screen contained the coordinated movements. The user could input the can speed in order to simulate the proper filling time; a counter in the control program stepped through degrees along the machine at the entered speed. The loaf valve program contained movements governed by the existing mechanical cam. Both the piston filler and can movement timing were altered to achieve the target product.

In order to fill the food product, an external piston filler was attached to a standard vacuum filler, with a slight modification to the standard filling head. The modified piston filler performed gravity-filling of gravy out of an external bowl into a flexible hose. Two pneumatic valves controlled the gravy flow into and out of the hose. The hose was connected directly to the filling nozzle, which is routed through the center of the existing filling head. This modification did not alter the existing functionality (product flow, vacuum, steam flush) of the filling head.

Figure 10:
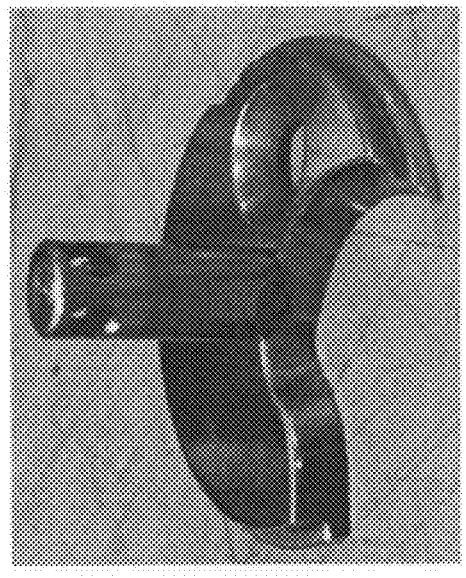
FIG. 10 is a photograph of a nozzle with horizontal apertures, used in the Example.
Figure 9:
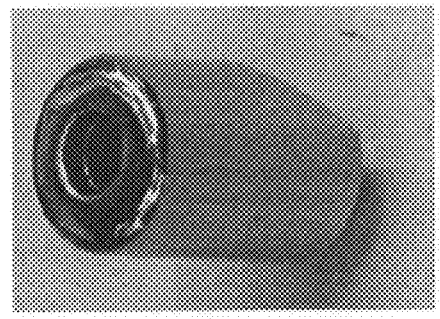
FIG. 9 is a photograph of a nozzle with a vertical aperture, used in the Example.

Two nozzles were tested in the study. The first nozzle (FIG. 9) had a vertical product path and an opening perpendicular to the flow, so that the gravy was always flowing vertically. The second nozzle (FIG. 10) had a vertical product path, but four 5-millimeter diameter holes parallel to the product path, so that the gravy exited the nozzle perpendicularly and horizontally.

The table in FIG. 11 describes the series of tests conducted in the study. All tests were conducted with defrosted loaf material and gravy mixed on-demand. The loaf was defrosted in a 52° C. water bath over the course of approximately one hour. The gravy was prepared with 2% guar gum and ambient temperature water with a high shear mixer powered by a hand drill.

After filling, the cans were seamed by a 10-head seamer on-site. At full speed, this 10-head seamer runs at approximately the same speed as the industrial seamer located in most 85-gram canning factories. After seaming, cans were either frozen or retorted using a small retort. The retort was fabricated onsite: a small cylindrical pressure vessel equipped with an automatic temperature monitoring system, manual steam valves, a manual counterpressure (compressed air) system, manual cooling water valves, and manual drain valves. The temperature and pressure were regulated throughout the cycle according to a typical pilot plant process. In the retort, cans were stacked lid down on a sheet of perforated metal.

Results

The results of each test were determined by evaluating frozen and/or retorted product. The target, or concept, product is a "heart" of gravy centered and encapsulated on both top and bottom by the loaf material. Photos of frozen samples are shown to best illustrate the success or failure of each test.

Figure 12:
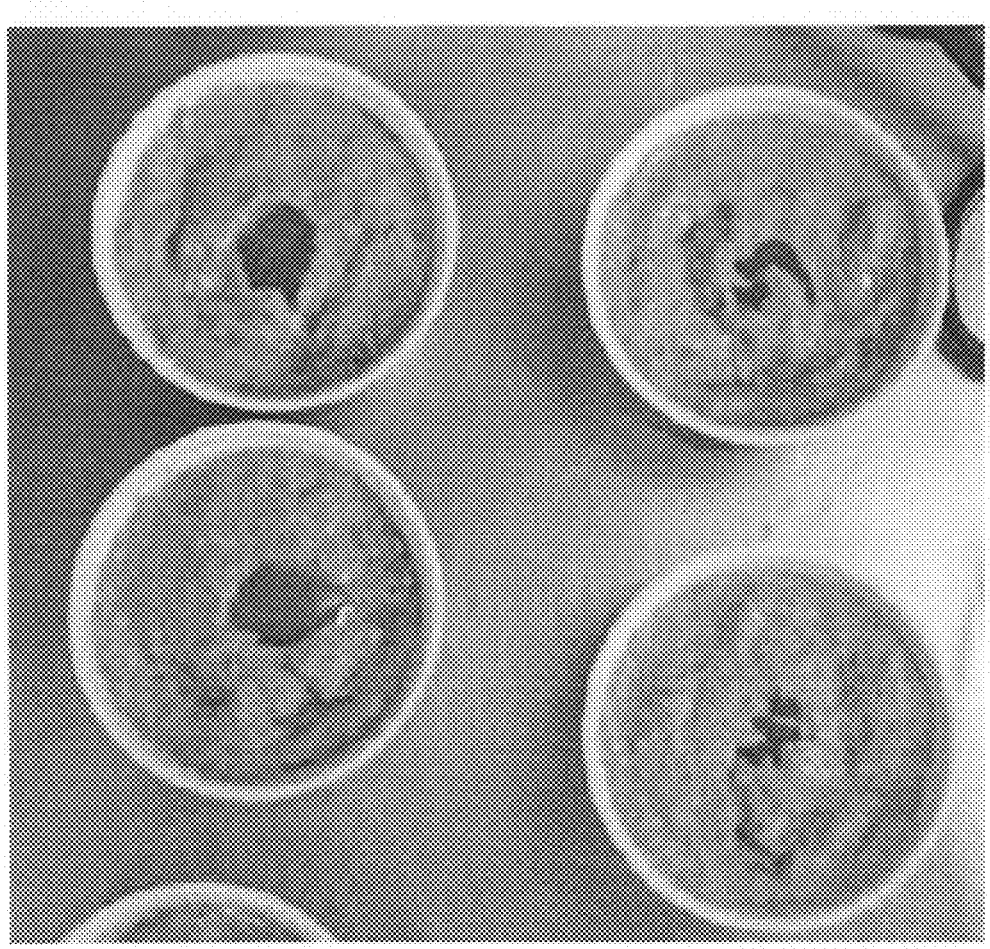
FIG. 12 is a photograph of the top side of the food product of Test 1 in the Example.

Test 1 resulted in a product with a hole on both the top and bottom of the product, with a cylindrical cavity in the center. The pre-retort product (not frozen) is shown in FIG. 12. These products did not achieve the target product.

Figure 13:
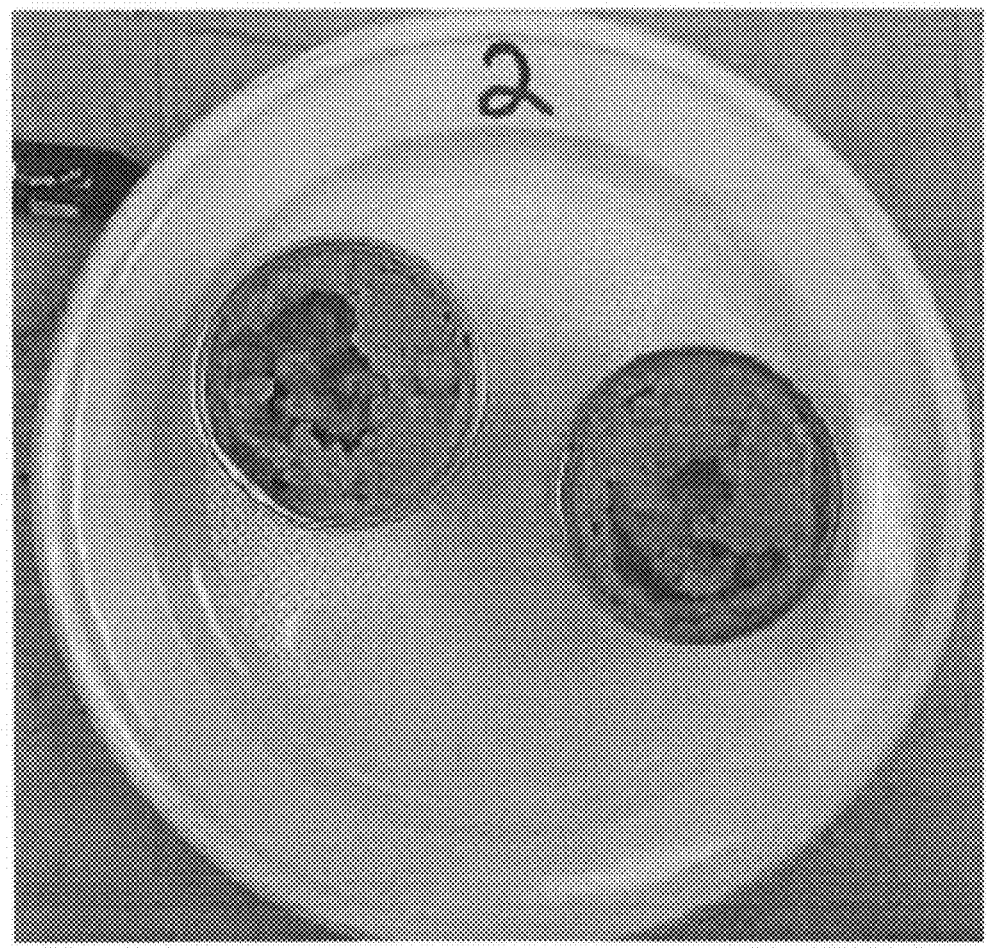
FIG. 13 is a photograph of the top side of the food product of Test 2 in the Example.
Figure 14:
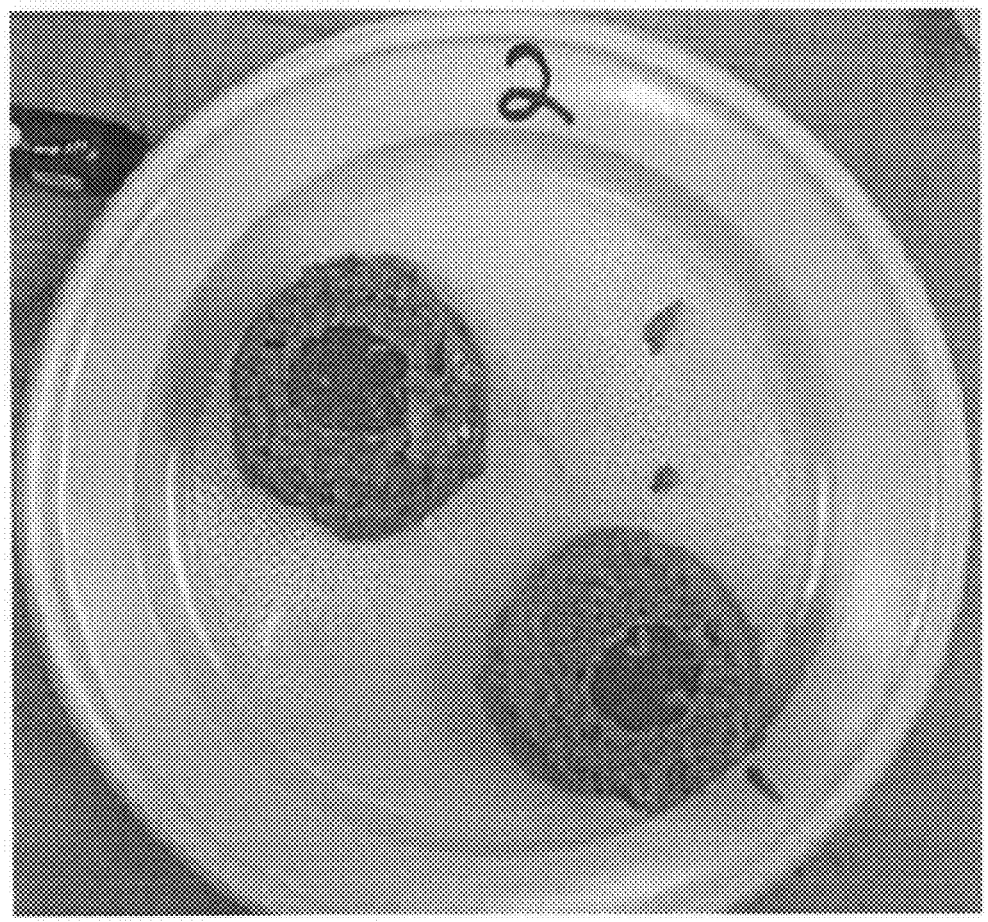
FIG. 14 is a photograph of the bottom side of the food product of Test 2 in the Example.
Figure 15:
FIG. 15 is a photograph of the cut-open food product of Test 2 in the Example.
Figure 16:
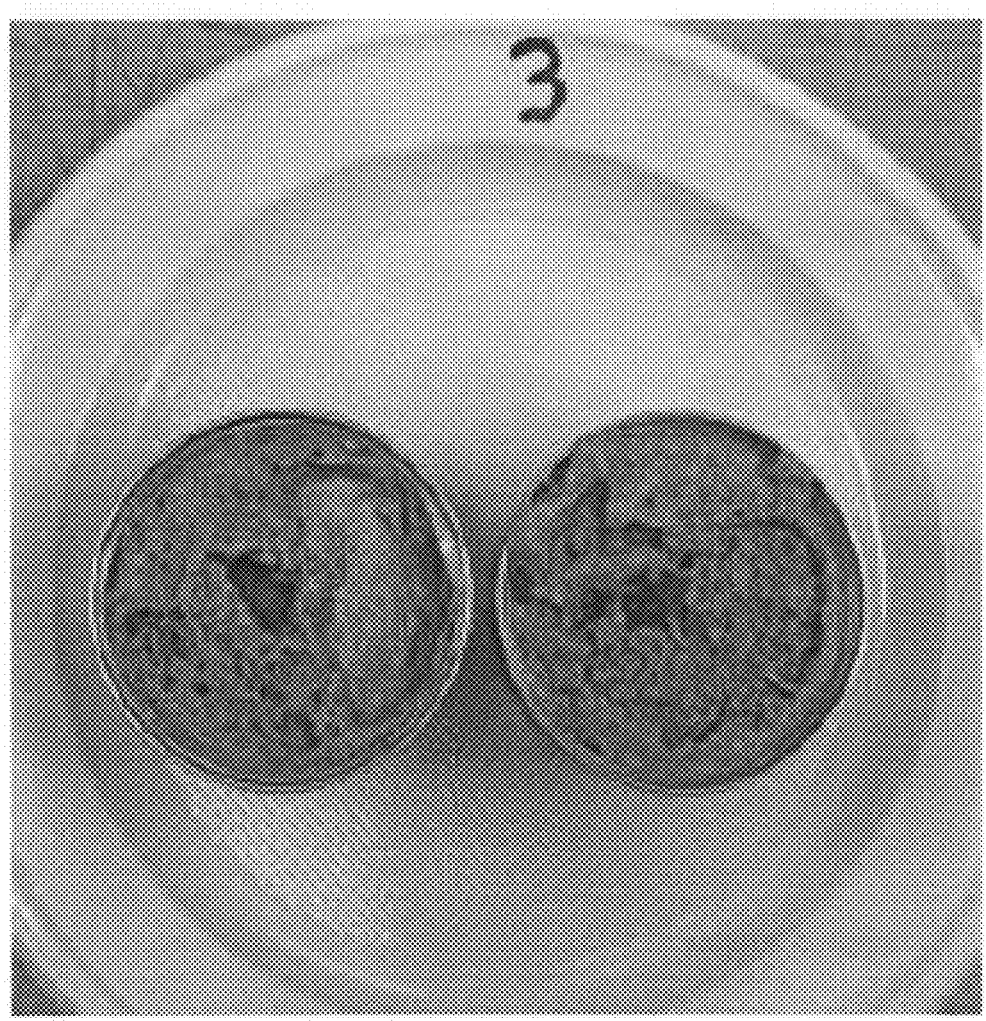
FIG. 16 is a photograph of the top side of the food product of Test 3 in the Example.
Figure 17:
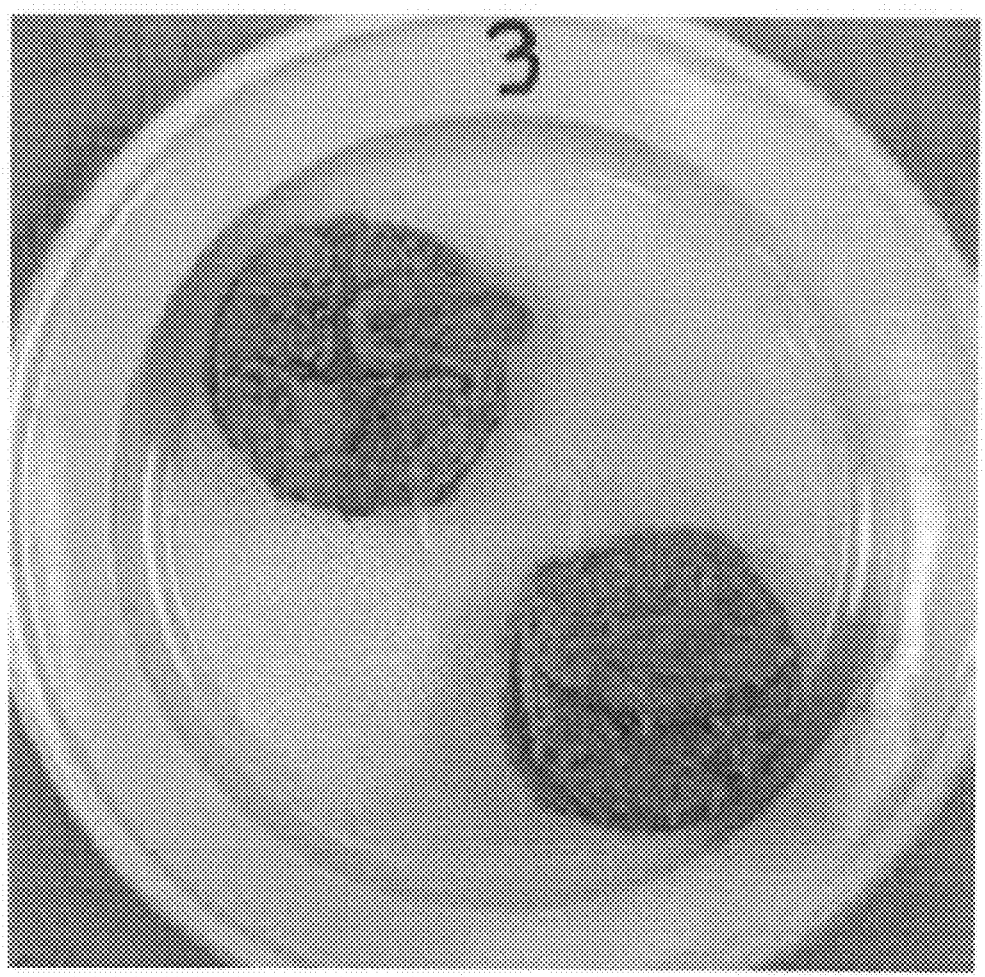
FIG. 17 is a photograph of the bottom side of the food product of Test 3 in the Example.
Figure 18:
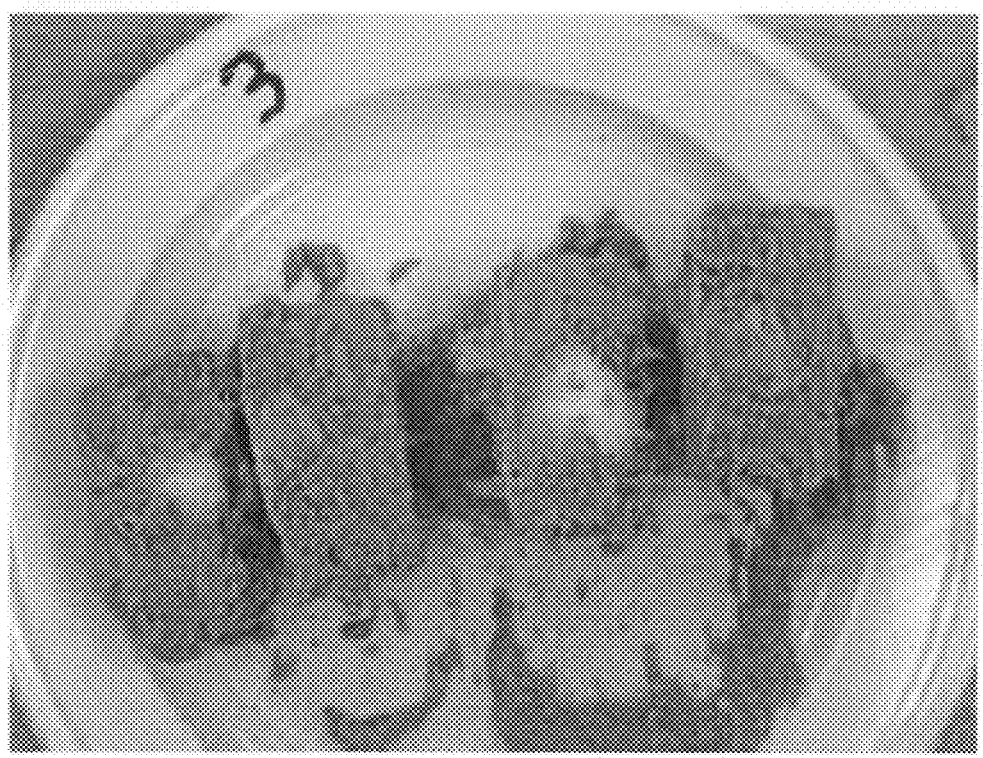
FIG. 18 is a photograph of the cut-open food product of Test 3 in the Example.
Figure 19:
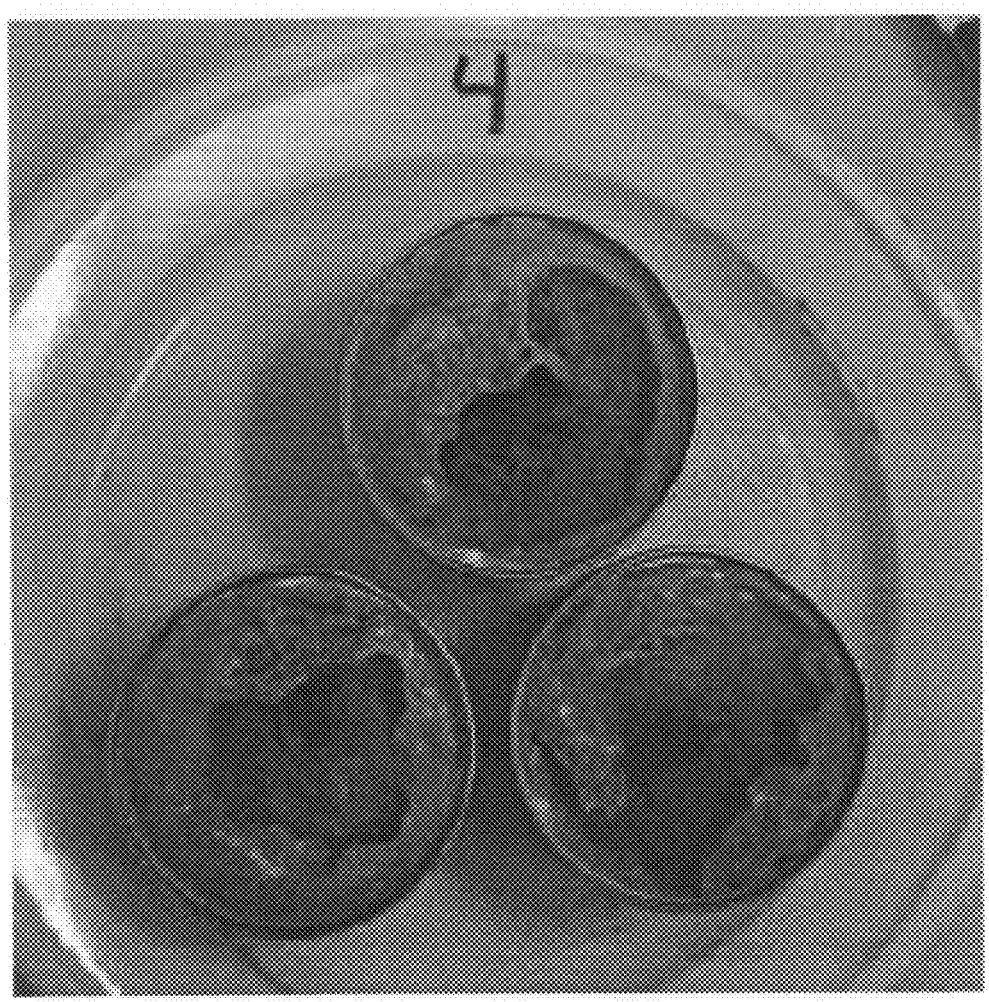
FIG. 19 is a photograph of the top side of the food product of Test 4 in the Example.
Figure 20:
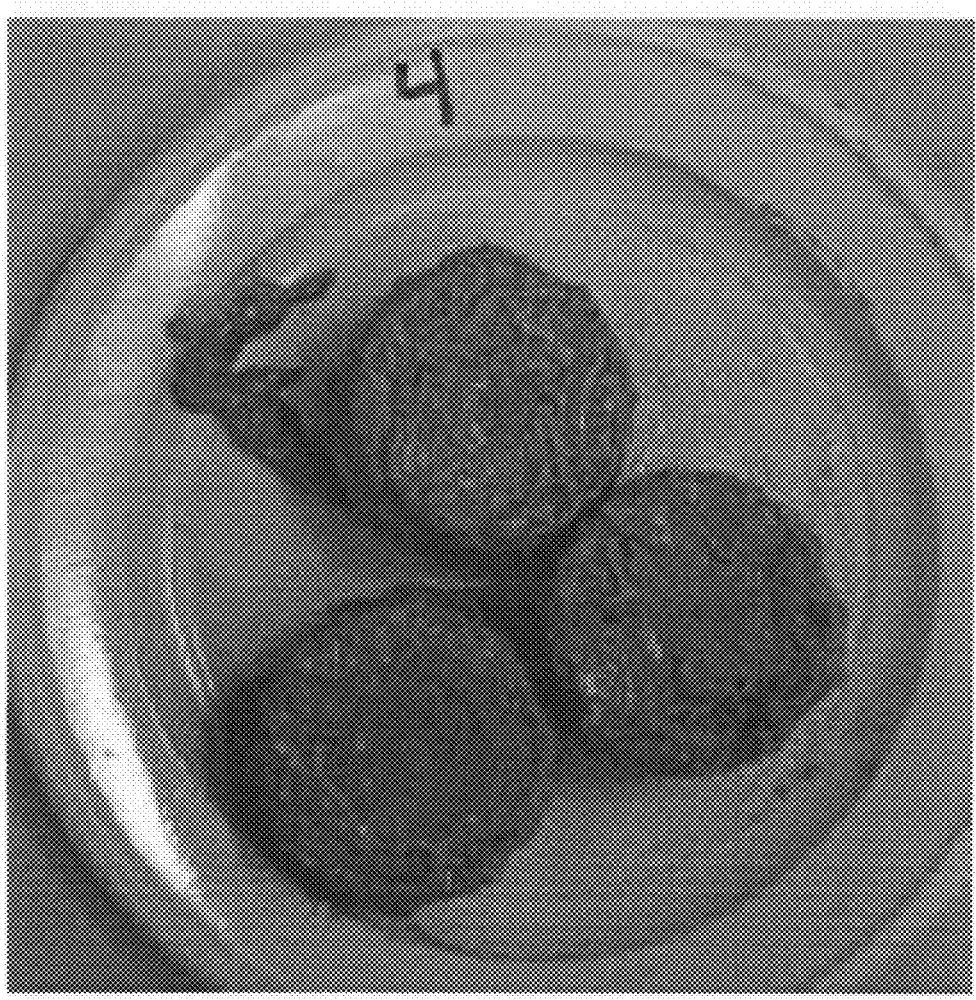
FIG. 20 is a photograph of the bottom side of the food product of Test 4 in the Example.
Figure 21:
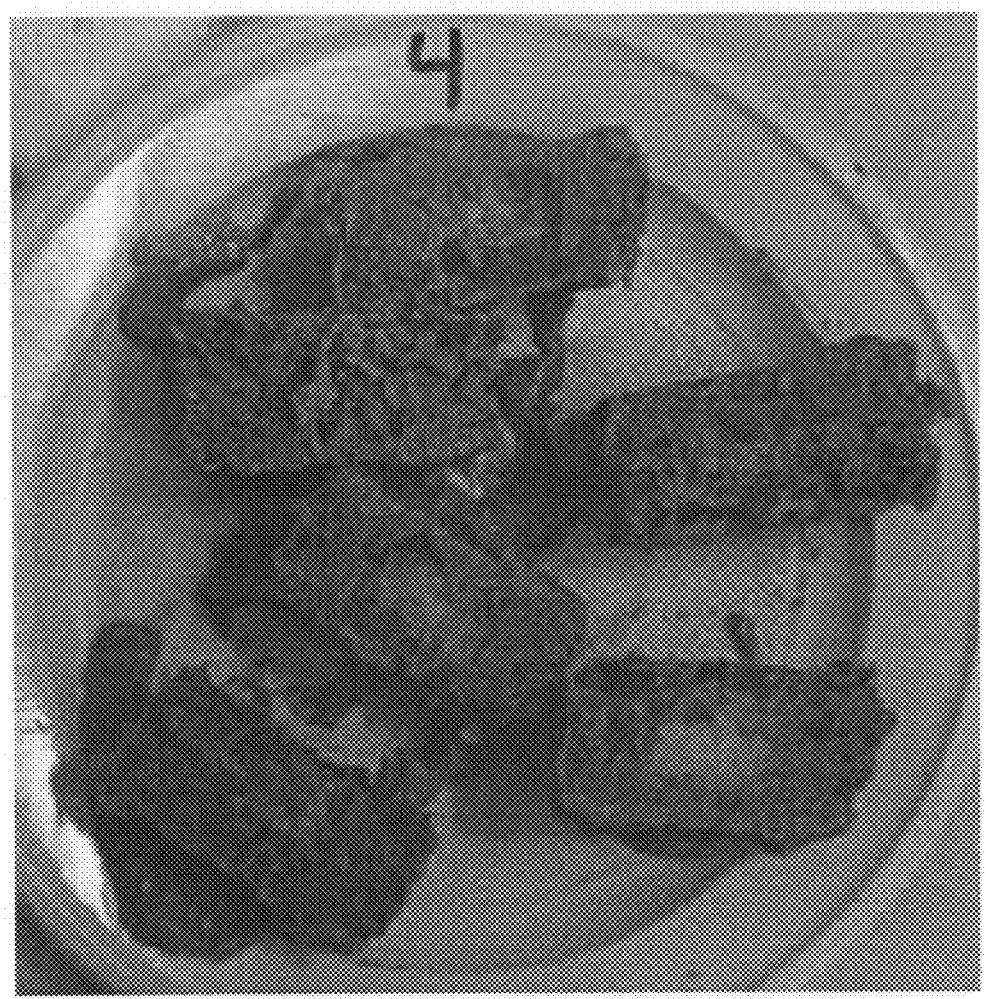
FIG. 21 is a photograph of the cut-open food product of Test 4 in the Example.

Test 2 decreased the hole on the top of the loaf and changed the shape of the cavity to a mushroom shape (FIGS. 13-15). There was a large hole on the bottom. These products did not achieve the target product.

Tests 3 and 4 with the horizontal nozzle greatly reduced and sometimes eliminated the hole in the bottom of the product (FIGS. 16-18 and FIGS. 19-21, respectively). A small injection hole was left on top of the product, with a horizontal, oval-shaped cavity in the center of the loaf. Some inconsistency in the centering of top hole was noted in these samples. These products are close to the target product.

Figure 22:
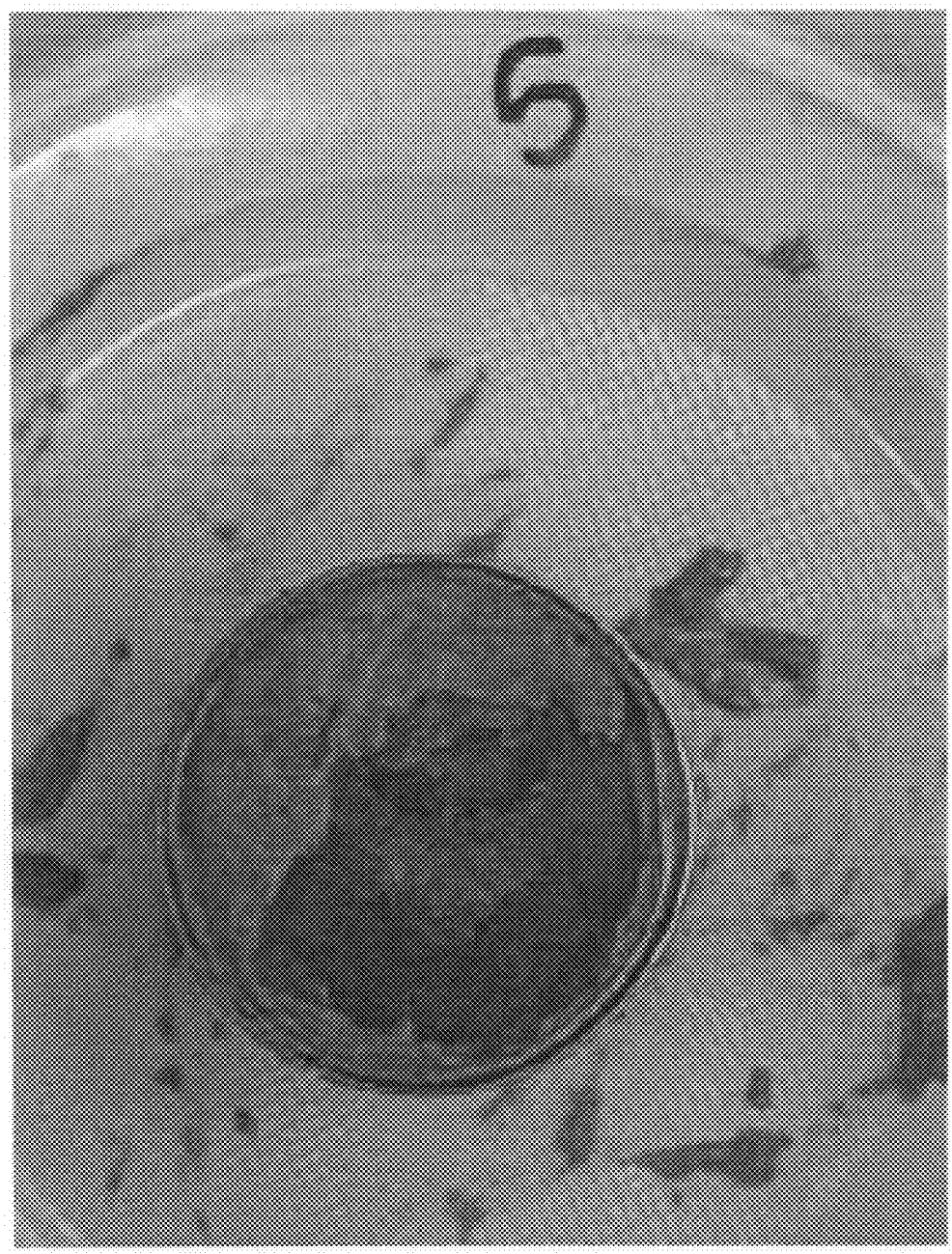
FIG. 22 is a photograph of the top side of the food product of Test 5 in the Example.
Figure 23:
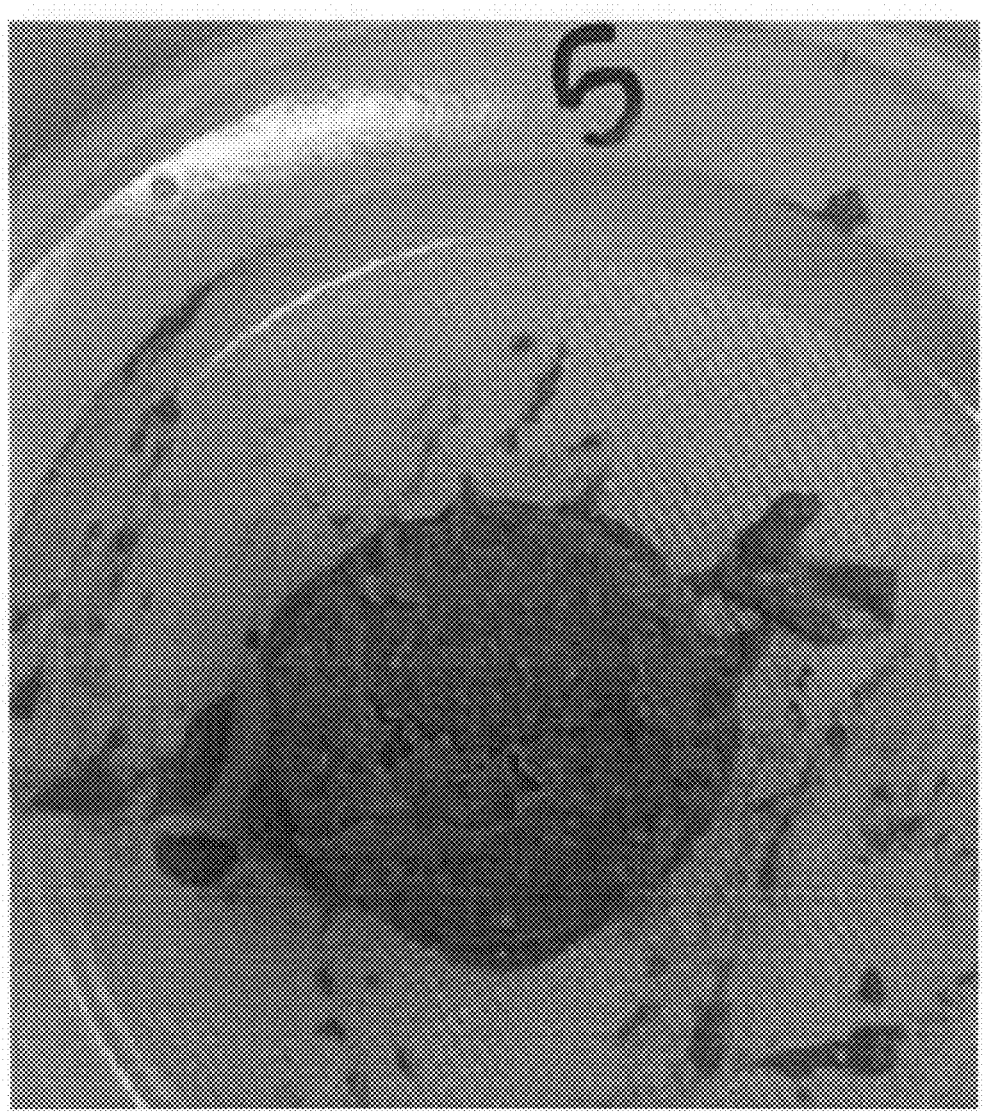
FIG. 23 is a photograph of the bottom side of the food product of Test 5 in the Example.
Figure 24:
FIG. 24 is a photograph of the cut-open food product of Test 5 in the Example.

Test 5 with an 8-gram fill and the horizontal nozzle resulted in a hole on the top, no hole on the bottom, and a smaller cavity than the previous tests (FIGS. 22-24). No significant benefit was noted in reducing the gravy amount in this case. This product is close to the target product.

Figure 25:
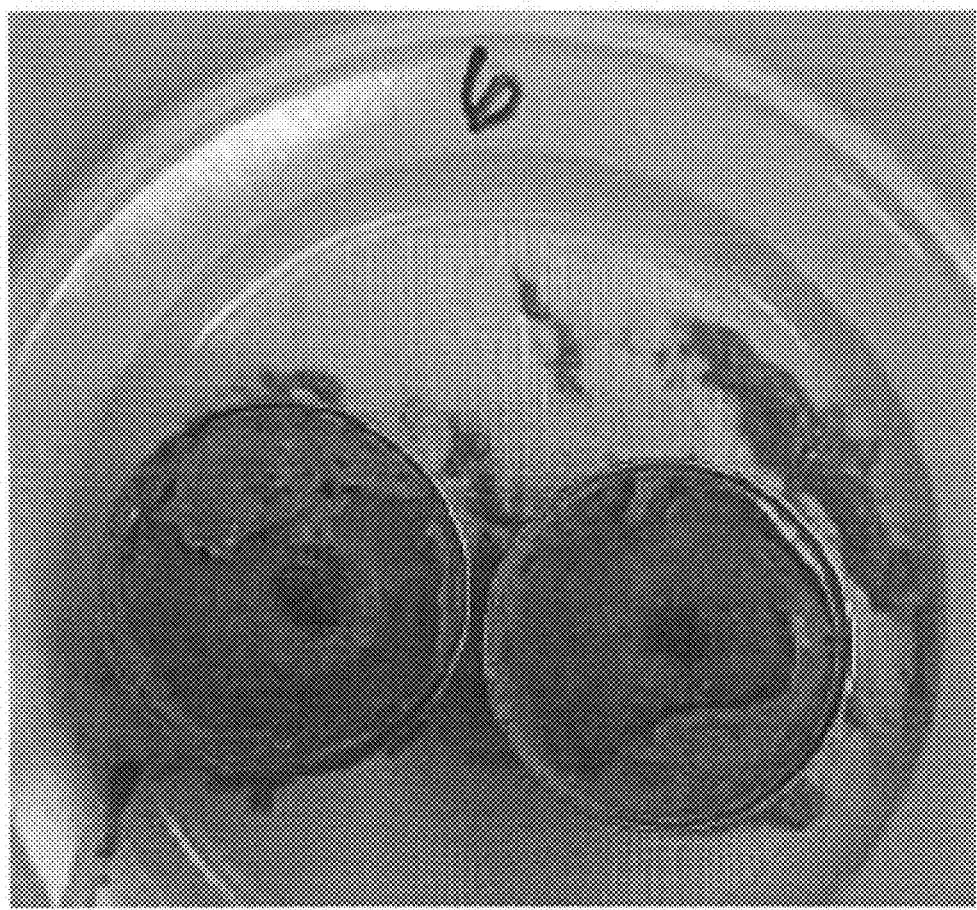
FIG. 25 is a photograph of the top side of the food product of Test 6 in the Example.
Figure 26:
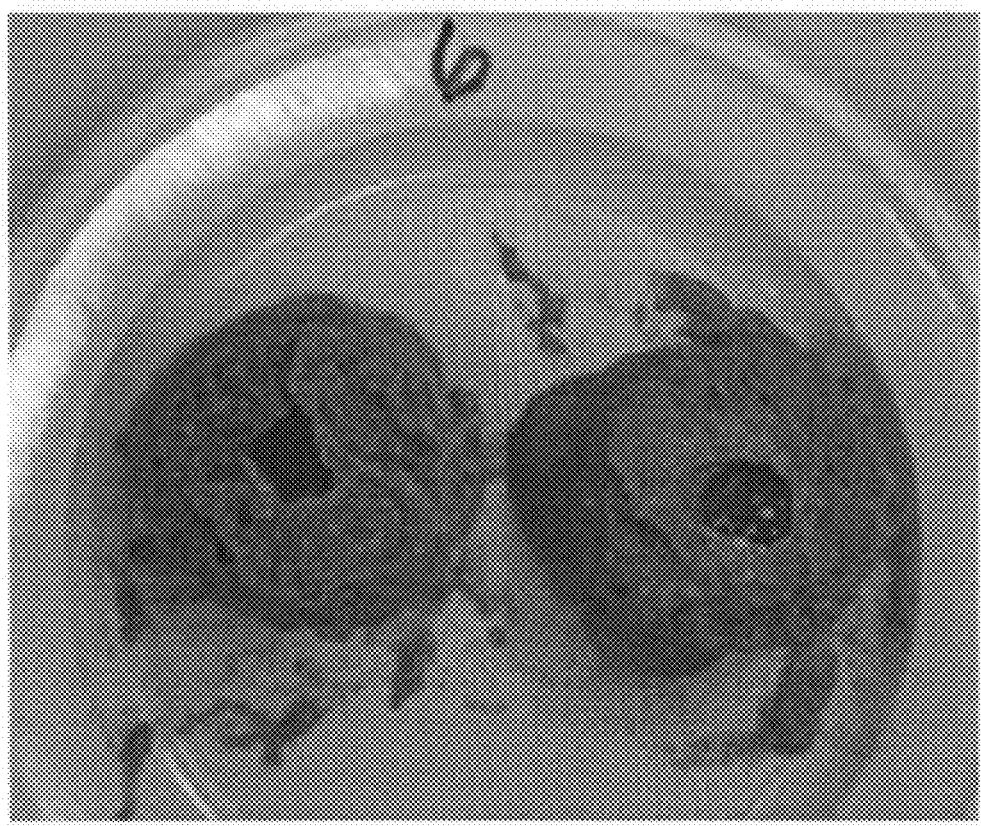
FIG. 26 is a photograph of the bottom side of the food product of Test 6 in the Example.
Figure 27:
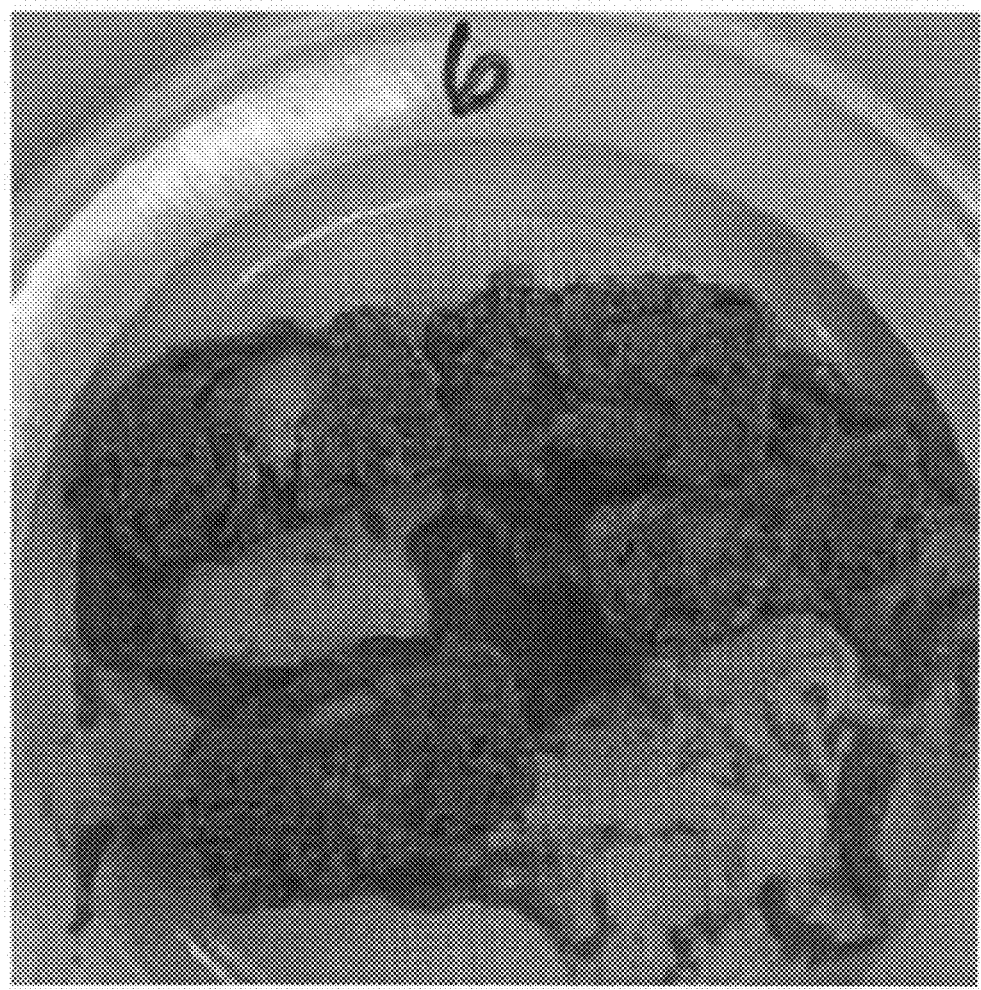
FIG. 27 is a photograph of the cut-open food product of Test 6 in the Example.

Test 6 with an 8-gram fill and the vertical nozzle reduced the size of the top and bottom holes and the center cavity compared with Tests 1 and 2 (FIGS. 25-27). However, this product still did not achieve the target product.

Figure 28:
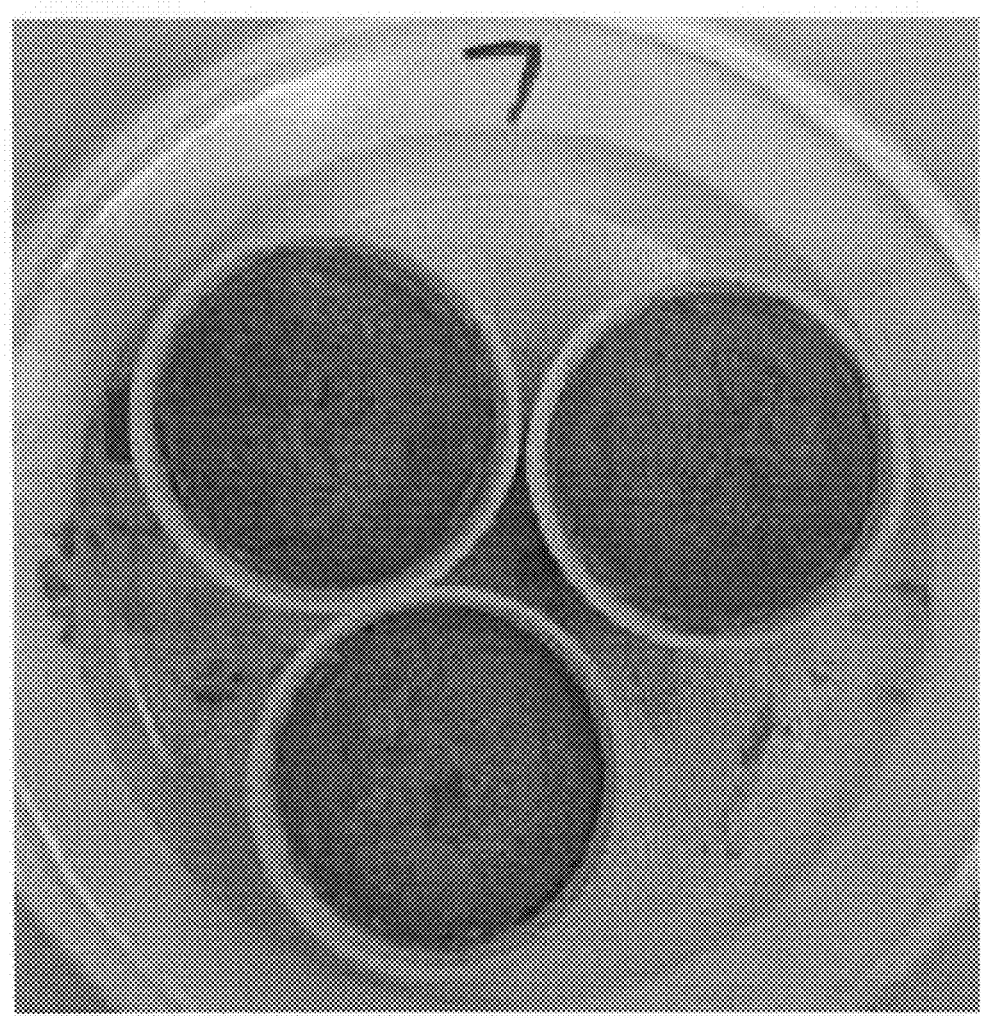
FIG. 28 is a photograph of the top side of the food product of Test 7 in the Example.
Figure 29:
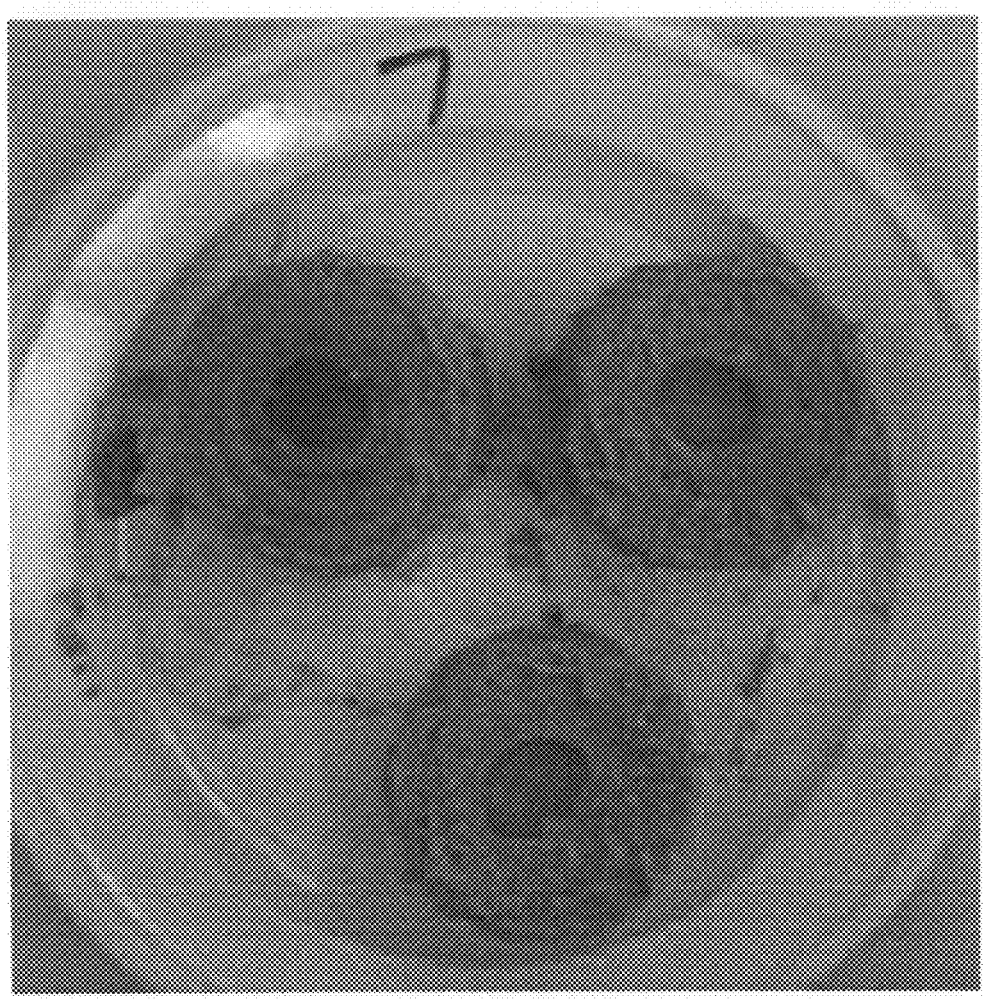
FIG. 29 is a photograph of the bottom side of the food product of Test 7 in the Example.
Figure 30:
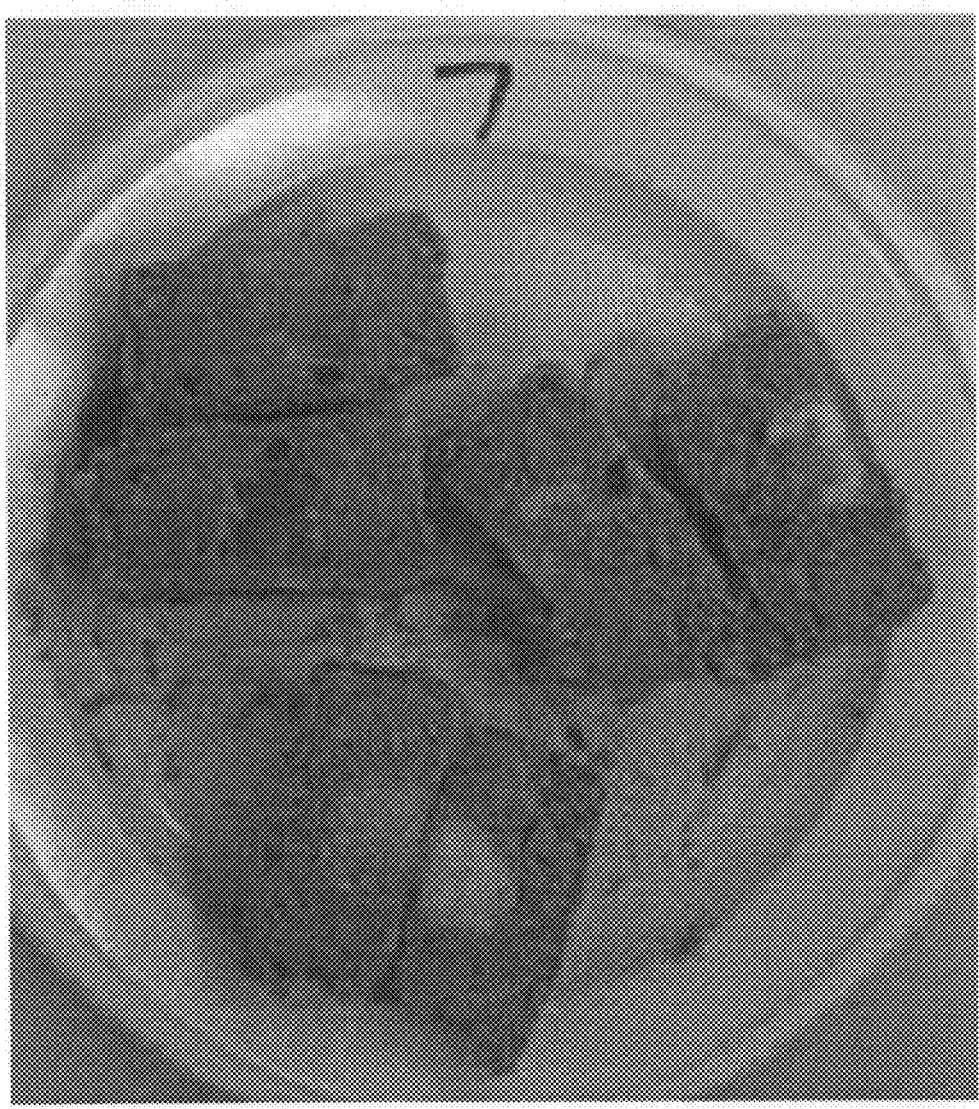
FIG. 30 is a photograph of the cut-open food product of Test 7 in the Example.

Tests 7 and 8 were performed with an 8-gram fill and a different can movement. After the loaf fill, the can descended briefly, stopped for a short amount of time, and then continued its descent. This movement would require a different can movement cam (located in the bottom of the machine) but should have no effect on the standard loaf fill. Test 7 with the vertical nozzle eliminated the top hole, but there was still a bottom hole (FIGS. 28-30). These products did not achieve the target product due to the large size of the bottom hole.

Figure 31:
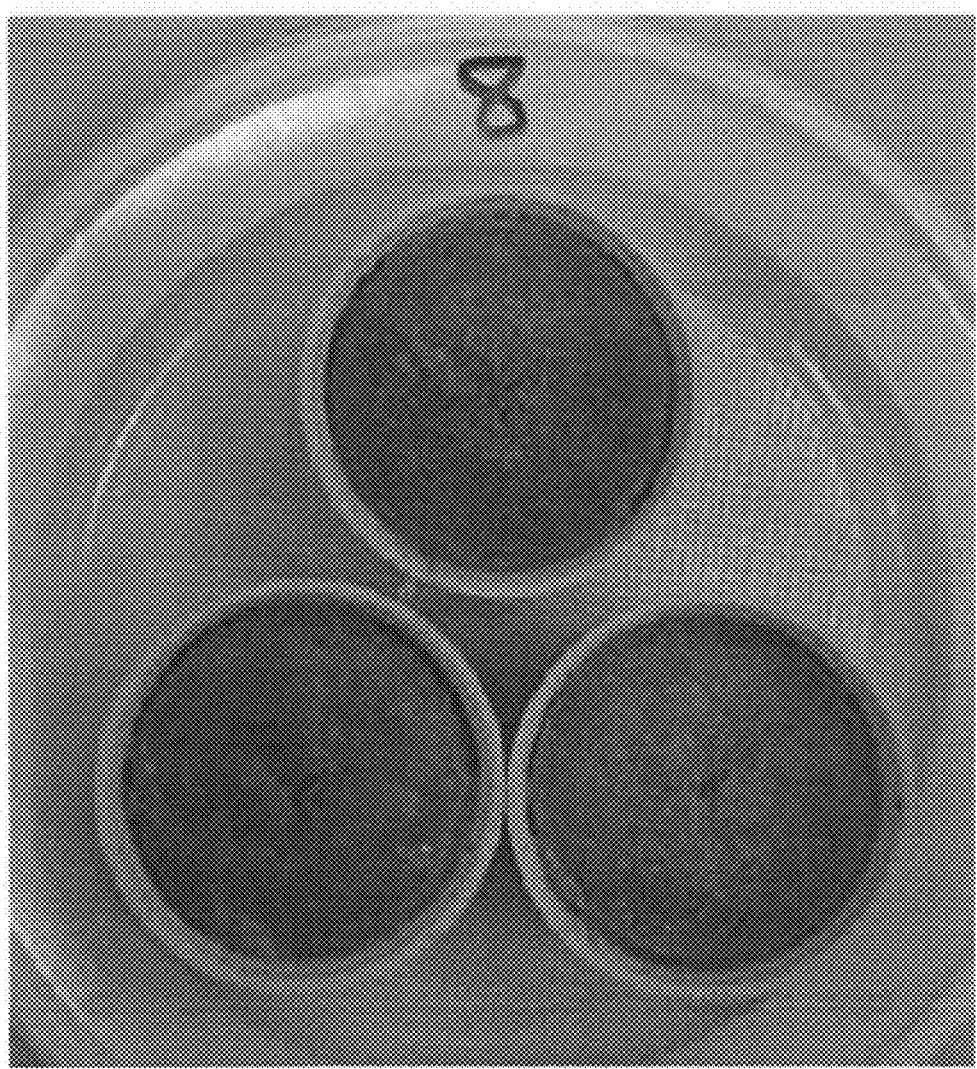
FIG. 31 is a photograph of the top side of the food product of Test 8 in the Example.
Figure 32:
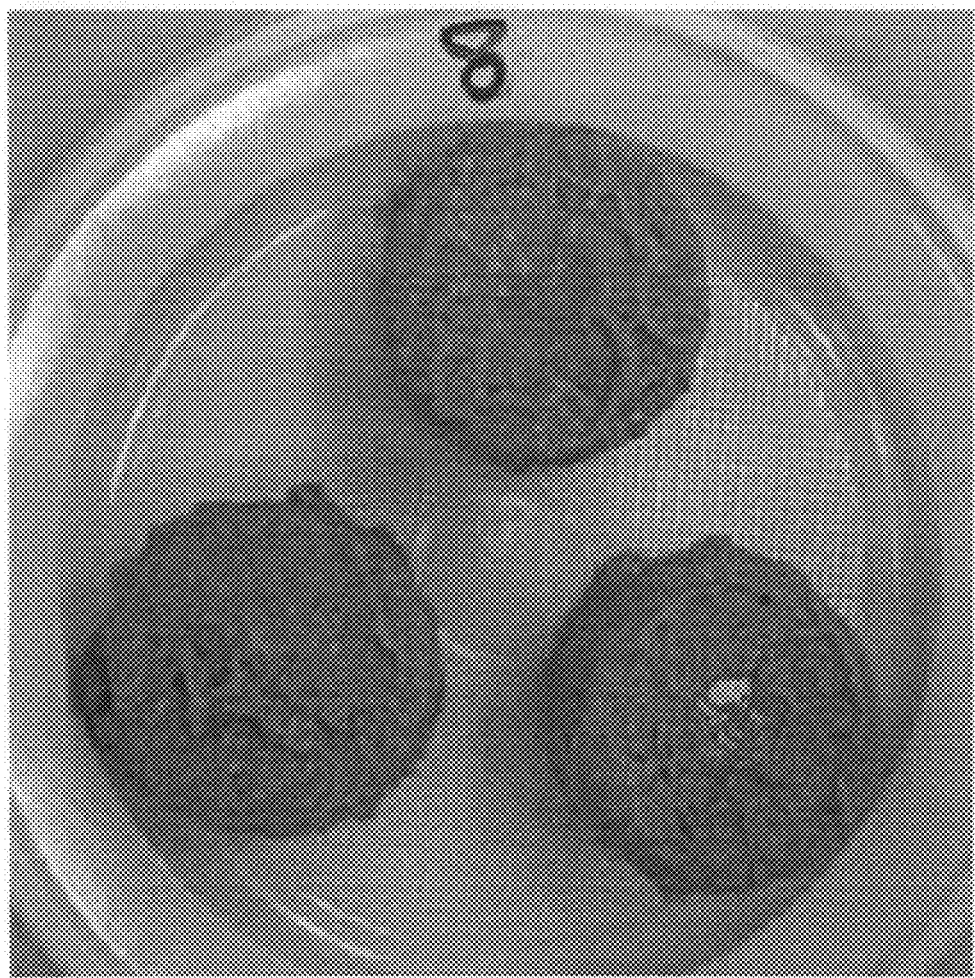
FIG. 32 is a photograph of the bottom side of the food product of Test 8 in the Example.
Figure 33:
FIG. 33 is a photograph of the cut-open food product of Test 8 in the Example.

Test 8 with the horizontal nozzle eliminated both the top and bottom holes, in some cases creating a heart-shaped cavity exactly in the center of the can (FIGS. 31-33). These products achieve the target product.

A cutting was held on the last day of testing, where the remaining frozen and retorted samples were uniformly evaluated. The table in FIG. 34 contains the results of this cutting.

Testing was conducted as each product was made to determine the filling standard deviation. The gravy system was tested first. As shown in FIG. 34, the first test of the gravy system resulted in a standard deviation of 0.51 grams. This test was conducted just after the gravy bowl was filled—the piping to the nozzle may not have been completely filled. The second test with the gravy shows an improved standard deviation of 0.14 grams. The standard deviations for the full-can fills range from 0.62 to 0.77 grams.

CONCLUSIONS

The simulator was a robust proof-of-concept for this project. The system exactly replicated the filling time available on a 90-head vacuum filler. All pieces of the main valve and gravy system were the same size as they would be on the industrial machine.

The target product was made on the simulator at full speed with an 8-gram fill in Test 8. This solution involved a unique horizontal nozzle design, a new gravy handling and dosing system, and a modification to the can movement cam. The product featured a completely enclosed gravy center, with a very small or no hole on the top and no hole on the bottom. Overall, the best results were achieved with the horizontal nozzle compared to the vertical nozzle. The new nozzle, with holes drilled into the side of the nozzle body, allows for product flow horizontally to the lateral sides of the can rather than vertically to the bottom of the can. Tests 3 and 4 were the most successful after Test 8. These tests would not require an adjustment to the can movement cam.

It should be understood that various changes and modifications to the presently preferred embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention is claimed as follows:

1. A method for making a canned food product comprising a meat emulsion and a gravy, the method comprising:
   dispensing the meat emulsion from a filling head into a can in a first position, the can comprising a single opening and positioned upright such that the single opening faces upward;
   dispensing the gravy into the meat emulsion and toward the sides of the can from a nozzle extending from the filling head, the nozzle comprises four apertures spaced about 90 degrees apart, each aperture at the same height on the nozzle and positioned in a lateral surface of the nozzle, wherein the apertures are horizontally-facing relative to the single opening of the can and wherein the apertures are centered horizontally and vertically at the approximate center of the meat emulsion, wherein the gravy is dispensed into the can with the can in a second position and the distance from the filling head to the can in the second position is greater than the distance from the filling head to the can in the first position;
   removing the nozzle from within the can, and the meat emulsion completely encloses the gravy, the removing of the nozzle from within the can comprises moving the can from the second position to a third position in which the distance from the can to the filling head is greater than the distance from the filling head to the can in the second position, wherein the can is maintained in the second position during the dispensing of the gravy such that movement of the can from the first position to the third position is not continuous; and
   retorting the can in which the meat emulsion completely encloses the gravy at a temperature from about 121° C. to about 128° C. for a time period from about 25 to about 50 minutes, the gravy remains completely enclosed by the meat emulsion after the retorting.

2. The method of claim 1 wherein the first position of the can forms a sealing engagement of the can with the filling head, and a vacuum in the can pulls the first composition into the can.

3. The method of claim 1 wherein the canned food product is formulated for a companion animal.

4. The method of claim 1 wherein the dispensing of the gravy into the meat emulsion comprises directing the gravy into a vertical passage of the nozzle and dispensing the gravy through the apertures in a substantially perpendicular direction relative to the vertical passage.

5. A canned food product made by a method comprising:
dispensing a meat emulsion from a filling head into a can in a first position, the can comprising a single opening, and the can positioned upright such that the single opening faces upward;
dispensing a gravy into the meat emulsion and toward the sides of the can from a nozzle extending from the filling head, the nozzle comprises four apertures spaced about 90 degrees apart, each aperture at the same height on the nozzle and positioned in a lateral surface of the nozzle, wherein the apertures are horizontally-facing relative to the single opening of the can and wherein the apertures are centered vertically and horizontally at the approximate center of the meat emulsion, the gravy is dispensed into the can with the can in a second position and the distance from the filling head to the can in the second position is greater than the distance from the filling head to the can in the first position;
removing the nozzle from within the can, and the meat emulsion completely encloses the gravy to form the canned food product, the removing of the nozzle from within the can comprises moving the can from the second position to a third position in which the distance from the can to the filling head is greater than the distance from the filling head to the can in the second position, wherein the can is maintained in the second position during the dispensing of the gravy such that the movement of the can from the first position to the third position is not continuous; and
retorting the can at a temperature from about 121° C. to about 128° C. for a time period from about 25 to about 50 minutes, the gravy remains completely enclosed by the meat emulsion after the retorting.

6. A method for making a canned food product comprising a meat emulsion and a gravy, the method comprising:
dispensing the meat emulsion from a filling head into a can in a first position, the can comprising a single opening and positioned upright such that the single opening faces upward, the first position of the can forms a sealing engagement of the can with the filling head, and a vacuum in the can pulls the meat emulsion into the can;
dispensing the gravy into the meat emulsion and toward the sides of the can from a nozzle extending from the filling head, the nozzle comprises four apertures spaced about 90 degrees apart, each aperture at the same height on the nozzle and positioned in a lateral surface of the nozzle, wherein the apertures are horizontally-facing relative to the single opening of the can, the gravy is dispensed into the can with the can in a second position, the nozzle extends from the filling head, and the distance from the filling head to the can in the second position is greater than the distance from the filling device to the can in the first position, wherein the dispensing of the gravy into the meat emulsion comprises directing the gravy into a vertical passage of the nozzle and dispensing the gravy through the apertures in a substantially perpendicular direction relative to the vertical passage, wherein the apertures are centered horizontally and vertically at the approximate center of the meat emulsion;
removing the nozzle from within the can, and the meat emulsion completely encloses the gravy, the removing of the nozzle from within the can comprises moving the can from the second position to a third position in which the distance from the can to the filling head is greater than the distance from the filling head to the can in the second position, wherein the can is maintained in the second position during the dispensing of the gravy such that movement of the can from the first position to the third position is not continuous: and
retorting the can in which the meat emulsion completely encloses the gravy at a temperature from about 121° C. to about 128° C. for a time period from about 25 to about 50 minutes, the gravy remains enclosed by the meat emulsion after the retorting.

\* \* \* \* \*